United States Patent [19]
Miura et al.

[11] Patent Number: 5,968,681
[45] Date of Patent: Oct. 19, 1999

[54] POLYETHER COPOLYMER AND POLYMER SOLID ELECTROLYTE

[75] Inventors: Katsuhito Miura, Sanda; Masanori Yanagida, Amagasaki; Hiroki Higobashi, Amagasaki; Takahiro Endo, Amagasaki, all of Japan

[73] Assignee: Daiso Co., Ltd, Osaka, Japan

[21] Appl. No.: 08/958,664

[22] Filed: Oct. 28, 1997

[30] Foreign Application Priority Data

Oct. 28, 1996 [JP] Japan .................................. 8-285047
Nov. 22, 1996 [JP] Japan .................................. 8-312228
Dec. 17, 1996 [JP] Japan .................................. 8-336783

[51] Int. Cl.$^6$ .................................................. H01M 6/00
[52] U.S. Cl. ........................ 429/122; 252/62.2; 429/188; 429/192; 429/194
[58] Field of Search ............................ 252/62.2; 429/122, 429/188, 192, 194

[56] References Cited

U.S. PATENT DOCUMENTS

| | | | |
|---|---|---|---|
| 4,578,326 | 3/1986 | Armand et al. | 429/192 |
| 4,758,483 | 7/1988 | Armand et al. | 429/192 |
| 4,818,644 | 4/1989 | Armand et al. | 429/192 |

FOREIGN PATENT DOCUMENTS

| | | |
|---|---|---|
| 0 222 586 | 5/1987 | European Pat. Off. . |
| 0 392 839 | 10/1990 | European Pat. Off. . |
| 0 460 876 | 5/1991 | European Pat. Off. . |
| 0 585 072 | 8/1993 | European Pat. Off. . |
| 62-169823 | 7/1987 | Japan . |
| 62-24361 | 10/1987 | Japan . |
| 63-154736 | 6/1988 | Japan . |
| 2-235957 | 9/1990 | Japan . |
| 3-47833 | 2/1991 | Japan . |
| 4-68064 | 3/1992 | Japan . |

OTHER PUBLICATIONS

Patent Abstract of Japan, vol. 12, No. 426, (C–542), Nov. 10, 1988, asbstract of Nakada Tetsuya, "Polyether Copolymer Having Oligooxyethylene Side Chain", Japanese 63–154736, Jun. 28, 1988.

Patent Abstract of Japan, vol. 12, No. 124, (E–601), Apr. 16, 1988, abstract of Noda Tomohiko, "Organic Solid Electrolyte", Japanese 62–249361, Oct. 30, 1987.

Patent Abstract of Japan, vol. 13, No. 348, (E–799), Aug. 4, 1989, abstract of Manabe Toshikatsu, "Lithium Ion Conductive Polymer Electrolyte", Japanese 01–107474, Apr. 25, 1989.

*Primary Examiner*—Samuel A. Acquah
*Attorney, Agent, or Firm*—Foley & Lardner

[57] ABSTRACT

A polyether copolymer prepared from 5 to 95% by mol of a monomer of the formula (I), 95 to 5% by mol of a monomer of the formula (II) and 0 to 15% by mol of a monomer of the formula (III) or (IV) as a crosslinking component; the copolymer having a weight-average molecular weight within the range from $10^3$ to $10^7$:

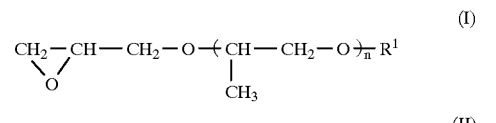

(I)

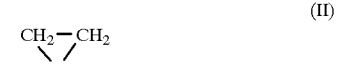

(II)

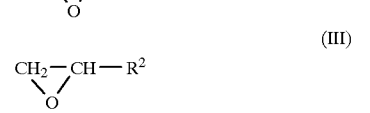

(III)

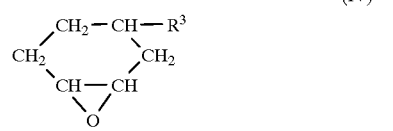

(IV)

The copolymer of the present invention provides a polymer solid electrolyte having such a feature that it is superior in ionic conductivity and also superior in processability, moldability, mechanical strength and flexibility to a conventional solid electrolyte.

28 Claims, No Drawings

POLYETHER COPOLYMER AND POLYMER SOLID ELECTROLYTE

FIELD OF THE INVENTION

The present invention relates to a polyether copolymer and a polymer solid electrolyte. More particularly it relates to a polymer solid electrolyte which is suitable as a material for electrochemical device (e.g. battery, capacitor, sensor, etc.) and an antistatic agent or electricity-controlling material for rubber, plastic, etc.

RELATED ART

As an electrolyte constituting an electrochemical device such as battery, capacitor, sensor, etc., those in the form of a solution or a paste have hitherto been used in view of the ionic conductivity. However, the following problems are pointed out. That is, there is a fear of damage of the device arising due to liquid leakage, and subminiaturization and thinning of the device are limited because a separator to be impregnated with an electrolysis solution is required. To the contrary, a solid electrolyte such as inorganic crystalline substance, inorganic glass, organic polymer substance, etc. is suggested. The organic polymer substance is generally superior in processability and moldability and the resulting solid electrolyte has good flexibility and bending processability and, furthermore, the design freedom of the device to be applied becomes high. Therefore, the development of the organic polymer substance is expected. However, the organic polymer substance is inferior in ionic conductivity to other materials at present.

Since the discovery of the ionic conductivity in a homopolymer of ethylene oxide and an alkaline metal ionic system, the study on the polymer solid electrolyte have been conducted intensively. As a result, polyether such as polyethylene oxide is considered to be most promising as a polymer matrix in view of its high freedom of movement and solubility of a metal cation. It became apparent that the movement of ions occurs at the amorphous portion, not the crystalline portion of the polymer. In order to reduce the crystallizability of polyethylene oxide, polyethylene oxide has been copolymerized with various epoxides ever since. Japanese Patent Kokai Publication No. 249361/1987 discloses a solid electrolyte comprising a copolymer of ethylene oxide and propylene oxide, and U.S. Pat. No. 4,818,644 discloses a solid electrolyte comprising a copolymer of ethylene oxide and methylglycidyl ether. However, the ionic conductivity of both solid electrolytes was not always satisfactory.

For example, an attempt of containing a specific alkaline metal salt in a mixture of an epichlorohydrin rubber and a low-molecular weight polyethylene glycol derivative and applying the resultant to a polymer solid electrolyte is suggested in Japanese Patent Kokai Publication No. 235957/1990, but a practically sufficient conductivity value is not still to be obtained.

Furthermore, a polymer solid electrolyte prepared by crosslinking a polymer compound described in Japanese Patent Kokai Publication Nos. 47833/1991 and 68064/1992 shows a comparatively good ionic conductivity within the practical temperature range, but those having more excellent mechanical characteristics and ionic conductivity are required.

SUMMARY OF THE INVENTION

The present invention has been accomplished so as to solve such problems, and an object of the present invention is to provide a polymer solid electrolyte having high ionic conductivity at room temperature, and a battery (electrochemical cell) comprising the electrolyte.

The present invention provides a polyether copolymer having a repeating structural unit comprising 5 to 95% by mol of a monomer of the formula (I), 95 to 5% by mol of a monomer of the formula (II) and 0 to 15% by mol of a monomer of the formula (III) or (IV) as a crosslinking component; the copolymer having a weight-average molecular weight within the range from $10^3$ to $10^7$:

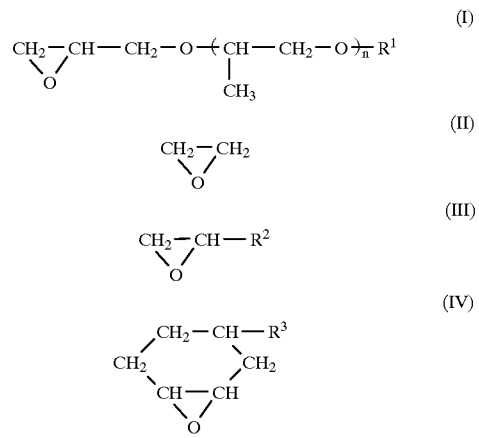

wherein $R^1$ of the formula (I) is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group; a polymerization degree n of an oxypropylene unit as the side chain portion is from 1 to 12; each of a substituent $R^2$ of the formula (III) and substituent $R^3$ of the formula (IV) is a substituent having an ethylenically unsaturated group, or a substituent having a reactive silicon group, or a substituent having an epoxy group at the terminal represented by the formula (V):

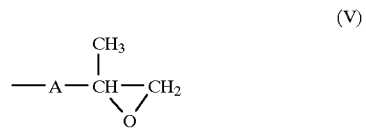

in which a group A represents a divalent organic moiety comprising atoms selected from carbon, oxygen and hydrogen atoms;

The present invention provides a crosslinked material of the above polyether copolymer.

The present invention also provides a polymer solid electrolyte comprising the above non-crosslinked or crosslinked polyether copolymer and an electrolyte salt compound which is soluble in the polyether copolymer.

The present invention further provides a battery comprising the above polymer solid electrolyte.

DETAILED DESCRIPTION OF THE INVENTION

The polymer solid electrolyte may be a crosslinked solid electrolyte of a crosslinked material obtained by crosslinking the mixture of the copolymer and an electrolyte salt compound by utilizing the reactivity of the copolymer. A crosslinked material may be prepared by utilizing the reactivity of the reactive group (for example, the $R^2$ group in the monomer (III) and $R^3$ group in the monomer (IV)) of the polyether copolymer.

A material having remarkably excellent ionic conductivity can be obtained by incorporating a plasticizer selected from an aprotic organic solvent, or a derivative or a metal salt of a linear or branched polyalkylene glycol or a metal salt of the derivative into a polymer solid electrolyte.

The present invention provides a polymer solid electrolyte prepared by blending a mixture comprising a non-crosslinked or crosslinked polyether copolymer having repeating units comprising 5 to 95% by mol of monomer of the formula (I), 95 to 5% by mol of a monomer of the formula (II) and 0 to 15% by mol of a reactive group-containing monomer of the formula (III) or (IV), and a plasticizer selected from the an aprotic organic solvent, or a derivative or a metal salt of a linear or branched polyalkylene glycol having a number-average molecular weight of 200 to 5000 or a metal salt of the derivative; with an electrolyte salt compound which is soluble in the composition comprising the polymer and the electrolyte salt compound.

The molecular weight of the derivative or metal salt of the polyalkylene glycol or the metal salt of the derivative is preferably from 200 to 5000 in number-average molecular weight (in terms of polyalkylene glycol).

When the plasticizer selected from aprotic organic solvent, the derivative or metal salt of the linear or branched polyalkylene glycol or the metal salt of the derivative is blended, crystallization of the polymer is inhibited and the glass transition temperature is lowered and a large amount of an amorphous phase is formed even at low temperature. Therefore, the ionic conductivity is improved so that a high-performance battery having small internal resistance can be obtained.

The copolymer prepared by copolymerizing the monomers (I) and (II), and optionally monomer (III) or (IV) has the following repeating units (I') and (II') and optionally (III') or (IV'):

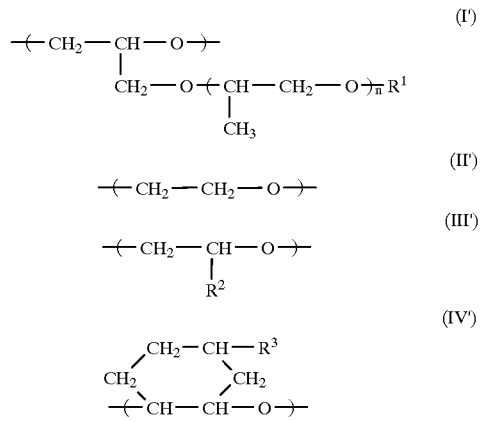

The copolymer of the present invention may have the following combinations of the repeating units:

(1) the formulas (I') and (II'),
(2) the formulas (I'), (II') and (III'),
(3) the formulas (I'), (II') and (IV'), or
(4) the formulas (I'), (II'), (III') and (IV').

Since the $R^2$ group and $R^3$ group in the repeating unit (III') and (IV') are a crosslinkable group, the copolymer comprising the repeating units (III') and/or (IV') can be crosslinked.

When the copolymer used in the present invention consists of the repeating units (I') and (II'), the repeating unit of the formula (I') is preferably from 5 to 70% by mol, more preferably from 5 to 60% by mol, and the repeating unit of the formula (II') is preferably from 95 to 30% by mol, more preferably from 95 to 40% by mol. When the molar ratio of the formula (II) exceeds 95% by mol, an increase in glass transition point and crystallization of the structural unit of the formula (II) arise, which results in drastic deterioration of the ion conductivity of the solid electrolyte. It is generally known that the ionic conductivity is improved by decreasing the crystallizability of polyethylene oxide. In case of the polyether copolymer of present invention, the effect of improving the ionic conductivity is remarkably large. The polyether copolymer of the present invention may be any copolymer such as a block copolymer and a random copolymer, but the random copolymer is preferable because the effect of decreasing the crystallizability of polyethylene oxide is large.

When the copolymer is a copolymer containing the monomers (III) and/or (IV), the content of the monomer of the formula (I) may be from 5 to 94% by mol, the content of the monomer of the formula (II) may be from 94 to 5% by mol and the content of the monomer of the formula (III) or (IV) may be from 0.001 to 15% by mol based on the amount of the copolymer. The copolymers in which the content of the monomer of the formula (I) is from 5 to 80% by mol, the content of the monomer of the formula (II) is from 93 to 18% by mol and the content of the monomer of the formula (III) or (IV) is from 0.01 to 10% by mol are preferable, and those in which the content of the monomer of the formula (I) is from 5 to 58% by mol, the content of the monomer of the formula (II) is from 93 to 40% by mol and the content of the monomer of the formula (III) is from 0.01 to 10% by mol are more preferable. As the monomer which is the monomer of the formula (III), an oxirane compound having an ethylenically unsaturated group, or an oxirane compound having a reactive silicon group, or an oxirane compound having an epoxy group at both ends. It is generally known that the ionic conductivity is improved by decrease of the crystallizability of polyethylene oxide. It has been found that, in case of the polyether copolymer of the present invention, the effect for improvement of the ionic conductivity is remarkably large. The polyether copolymer of the present invention may be any copolymer such as block copolymer or random copolymer, but the random copolymer is preferable because the effect for reduction of the crystallizability of polyethylene oxide is large.

The weight-average molecular weight of the polyether copolymer is preferably within the range from $10^3$ to $10^7$, more preferably from $10^4$ to $5\times10^6$, so as to obtain excellent processability, moldability, mechanical strength and flexibility. The range from $5\times10^4$ to $5\times10^6$ is more preferable. When the weight-average molecular weight is smaller than $10^3$, it is necessary to increase the crosslink density so as to maintain the mechanical strength or to prevent from flowing at high temperature, which results in decrease of ionic conductivity of the resulting electrolyte. On the other hand, when it exceeds $10^7$, the processability and moldability become insufficient.

In the present invention, the polymerization degree n of the oxypropylene unit at the side chain portion of the formula (I) of the polyether copolymer is preferably from 1 to 12. When the polymerization degree exceeds 12, the ionic conductivity of the resulting solid electrolyte is unfavorably lowered.

In the present invention, the polyether copolymer having a glass transition point of not more than −60° C. and a heat of melting of not more than 70 J/g are suitable.

The polymerization method for obtaining the polyether copolymer used in the present invention is a polymerization method for obtaining a copolymer by the ring opening reaction of the ethylene oxide portion, which is described in Japanese Patent Kokai Publication Nos. 154736/1988 and 169823/1987 (The disclosure of which is incorporated herein by reference). That is, it is obtained by reacting the monomers corresponding to the formulas (I) and (II) and crosslinking reactive monomer corresponding to the formula (III) at the reaction temperature of 10 to 80° C. under stirring, using a catalyst mainly composed of an organoalumminum, a catalyst mainly composed of an organozinc, an organotin-phosphate ester condensate catalyst, etc. as a ring-opening polymerization catalyst in the presence or absence of a solvent. In case of using an oxirane compound having an epoxy group only at both ends, particularly, only the epoxy group having no substituent, i.e. methyl group, is used in the polymerization reaction when the organotin-phosphate ester condensate catalyst is used so that the epoxy group having a methyl group is not reacted and remains in the polymer. The organotin-phosphate ester condensate catalyst is particularly preferable in view of the polymerization degree, or properties of the resulting copolymer.

[Monomer of formula (I)]

In the formulas (I), $R^1$ is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms and an aralkyl group having 7 to 12 carbon atoms and tetrahydropyranyl group.

The polymerization degree n of the oxypropylene unit of the side chain portion of the formula (I) is preferably from 1 to 12, for example 2 to 6. When it exceeds 12, the ionic conductivity of the resulting solid electrolyte is unfavorably deteriorated.

The group represented by $R^1$ may be a group selected from alkyl group having 1 to 6 carbon atoms and alkenyl group having 2 to 6 carbon atoms. The group represented by $R^1$ may be a group selected from a methyl group, an ethyl group, a propyl group and an allyl group.

[Monomer of the formula (III) or (IV)]

In the formulas (III), $R^2$ may represent an ethylenically unsaturated group, an reactive silicon-containing substituent or an epoxy group-containing substituent of the formula (V). In the formulas (IV), $R^3$ may represent a reactive silicon group-containing substituent. In the formula (V), A represents an organic moiety comprising elements selected from hydrogen, carbon and oxygen.

The monomers of the formulas (III) and (IV) may be an oxirane compound having an ethylenically unsaturated group, an oxirane compound having a reactive silicon group, or an oxirane compound having at least two epoxy groups (for example, an oxirane compound having two epoxy groups at both ends). The monomers of formulas (III) and (IV) may be oxirane compound having at least one reactive halogen atom. The monomer of the formula (IV) is preferably a oxirane compound having a reactive silicon group.

As the oxirane compound having an ethylenically unsaturated group, there can be used allyl glycidyl ether, 4-vinylcyclohexyl glycidyl ether, α-terpinyl glycidyl ether, cyclohexenylmethyl glycidyl ether, p-vinylbenzyl glycidyl ether, allylphenyl glycidyl ether, vinyl glycidyl ether, 3,4-epoxy-1-butene, 3-4-epoxy-1-pentene, 4,5-epoxy-2-pentene, 1,2-epoxy-5,9-cyclododecadiene, 3-4-epoxy-1-vinylcyclohexene, 1,2-epoxy-5-cyclooctene, glycidyl acrylate, glycidyl methacrylate, glycidyl sorbate, glycidyl cinnamate, glycidyl crotonate, glycidyl-4-hexenoate, olygoethylene glycol glycidyl ether acrylate having 1 to 12 oxyethylene chains, olygoethylene glycol glycidyl ether methacrylate having 1 to 12 oxyethylene chains and olygoethylene glycol allyl glycidyl ether having 1 to 12 oxyethylene chains. Preferably, allyl glycidyl ether, glycidyl acrylate or glycidyl methacrylate is used.

The oxirane compound containing the reactive silicon group is preferably selected from the formulas (a-1) to (a-3).

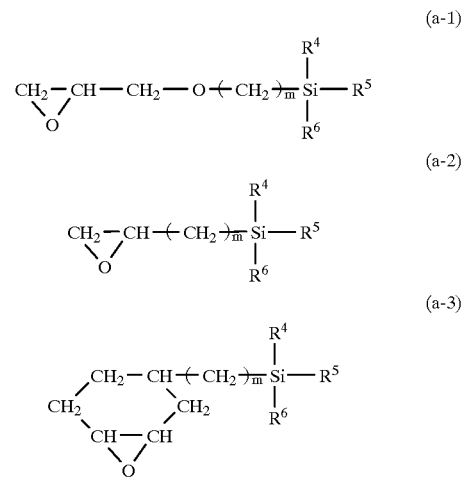

In the formulas (a-1), (a-2) and (a-3), $R^4$, $R^5$ and $R^6$ may be the same or different, and at least one of them represents an alkoxy group and the remainder represent an alkyl group. m represents an integer of 1 to 6.

Preferable examples of the monomer of formula (a-1) include 1-glycidoxymethyltrimethoxysilane, 1-glycidoxymethylmethyldimethoxysilane, 2-glycidoxyethyltrimethoxysilane, 2-glycidoxyethylmethyldimethoxysilane, 3-glycidoxypropylmethyldimethoxysilane, 3-glycidoxypropyltrimethoxysilane, 4-glycidoxyethylmethyldimethoxysilane, 4-glycidoxybutylmethyltrimethoxysilane, 6-glycidoxyhexylmethyldimethoxysilane, 6-glycidoxyhexylmethyltrimethoxy silane, etc.

Preferable examples of the monomer of formula (a-2) include 3-(1,2-epoxy) propyltrimethoxysilane, 3-(1,2-epoxy)propylmethyldimethoxysilane, 3-(1,2-epoxy) propyldimethyl-methoxysilane, 4-(1,2-epoxy)butyltrimethoxysilane, 4-(1,2-epoxy)butylmethyldimethoxysilane, 5-(1,2-epoxy)pentyltrimethoxysilane, 5-(1,2-epoxy)pentylmethyldimethoxysilane, 6-(1,2-epoxy) hexyltrimethoxyssilane, 6-(1,2-epoxy)hexylmethyldimethoxysilane and the like.

Preferable examples of the monomer of formula (a-3) include 1-(3,4-epoxycyclohexyl)methyltrimethoxysilane, 1-(3,4-epoxycyclohexyl)methyl-methyldimethoxysilane, 2-(3,4-epoxycyclohexyl)ethyltrimethoxysilane, 2-(3,4-epoxycyclohexyl) ethylmethyldimethoxysilane, 3-(3,4-epoxycyclohexyl)propyltrimethoxysilane, 3-(3,4-epoxycyclohexyl)propylmethyldimethoxysilane, 4-(3,4-epoxycyclohexyl) butyltrimethoxysilane, 4-(3,4-epoxycyclohexyl)butylmethyldimethoxysilane and the like.

Among the above more preferable examples, 3-glycidoxypropyltrimethoxysilane, 3-glycidoxypropylmethyldimethoxysilane, 4-(1,2-epoxy) butyltrimethoxysilane, 5-(1,2-epoxy)pentyltrimethoxysilane and 2-(3,4-epoxycyclohexyl)ethyltrimethoxysilane are particularly preferable.

The oxirane compound having two epoxy groups at both ends are preferably chosen from the formulas (b-1) to (b-3).

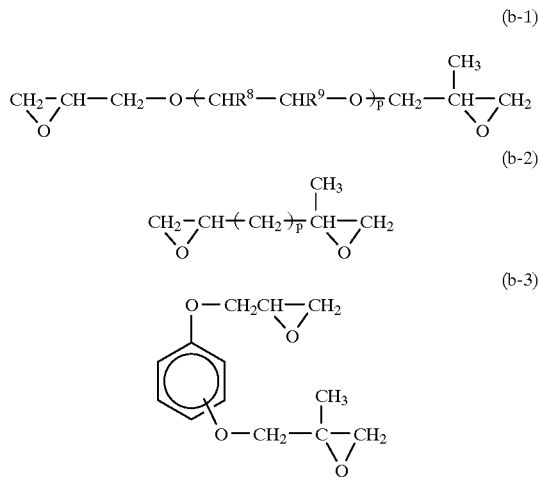

In the above formula (b-1), $R^8$ and $R^9$ represent a hydrogen atom or a methyl group, and p in the formulas (b-1) and (b-2) represents an integer of 0 to 12.

Examples of the monomer represented by the formula (b-1) include 2,3-epoxypropyl-2',3'-epoxy-2'-methyl propyl ether, ethyleneglycol-2,3-epoxypropyl-2',3'-epoxy-2'-methyl propyl ether, diethyleneglycol-2,3-epoxypropyl-2',3'-epoxy-2'-methyl propyl ether and the like. Examples of the monomer represented by the formula (b-2) include 2-methyl-1,2,3,4-diepoxybutane, 2-methyl-1,2,4,5-diepoxypentane, 2-methyl-1,2,5,6diepoxyhexane and the like. Examples of the monomer represented by the formula (b-3) include hydroquinone-2,3-epoxypropyl-2',3'-epoxy-2'-methyl propyl ether, catechol-2,3-epoxypropyl-2',3'-epoxy-2'-methyl propyl ether and the like.

Among the above more preferable monomers, 2,3-epoxypropyl-2',3'-epoxy-2'-methyl propyl ether and ethyleneglyco 2,3exoxypropyl-2',3'-epoxy-2'-methyl propyl ether are particularly preferable.

The oxirane compound having at least one reactive halogen atom is preferably represented by the formula:

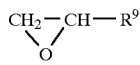

wherein $R^9$ is a group having at least one halogen atom.

Examples of the oxirane compound having at least one reactive halogen atom include:

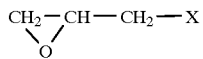

wherein X is a halogen atom, particularly a bromine atom (Br) or an iodine atom (I).

[Crosslinking]

As the crosslinking method of copolymer having an ethylenically unsaturated group used in the present invention, a radical initiator selected from an organic peroxide and an azo compound, and an active energy ray such as ultraviolet ray, electron ray, etc. are used. It is also possible to use a crosslinking agent comprising a hydrogenated silicon.

The crosslink utilizing the reactivity of the ethylenically unsaturated group may be crosslink due to a radical initiator selected from an organic peroxide and an azo compound, or crosslink due to active energy ray selected from ultraviolet ray and electron beam. The crosslink utilizing the reactivity of the ethylenically unsaturated group may be crosslink due to a hydrosilyl reaction between the ethylenically unsaturated group and the compound having at least two hydrogenated silicons.

As the organic peroxide, those normally used in the crosslinking, such as ketone peroxide, peroxy ketal, hydroperoxide, dialkyl peroxide, diacyl peroxide, peroxy ester and the like are used, and examples thereof include methyethylketone peroxide, cyclohexanone peroxide, 1,1-bis(t-butylperoxy)-3,3,5-trimethylcyclohexane, 2,2-bis(t-butylperoxy)octane, n-butyl-4,4-bis(t-butylperoxy)valerate, t-butyl hydroperoxide, cumene hydroperoxide, 2,5-dimethylhexane-2,5-dihydroperoxide, di-t-butyl peroxide, t-butylcumylperoxide, dicumylperoxide, α,α'-bis(t-butylperoxy-m-isopropyl)benzene, 2,5-dimethyl-2,5-di(t-butylperoxy)hexane, 2,5-dimethyl-2,5-di(t-butylperoxy)hexane, benzoylperoxide, t-butylperoxyisopropyl carbonate and the like. The amount of the organic peroxide varies depending on the type of the organic peroxide, but is normally within the range from 0.1 to 10% by weight based on the composition excluding the plasticizer.

As the azo compound, those normally used in the crosslinking, such as azonitrile compound, azoamide compound, azoamidine compound and the like are used. Examples thereof include 2,2-azobisisobutyronitrile, 2,2'-azobis(2-methylbutyronitrile), 2,2'-azobis(2,4-dimethylvaleronitrile), 2,2'-azobis(2,4-dimethylvaleronitrile), 1,1'(cyclohexane-1-carbonitrile), 2-(carbamoylazo)isobutyronitrile, 2-phenylazo-4-methoxy-2,4-dimethyl-valeronitrile, 2,2-azobis(2-methyl-N-phenylpropionamidine)dihydrochloride, 2,2'-azobis[N-(4-chlorophenyl)-2-methylpropionamidine]dihydrochloride, 2,2'-azobis[N-hydroxyphenyl-2-methylpropionamidine] dihydrochloride, 2,2'-azobis[2-methyl-N-(phenylmethly) propionamidine]dihydrochloride, 2,2'-azobis[2-methyl-N-(2-propenyl)propionamidine]dihydrochloride, 2,2'-azobis (2-methylpropionamidine)dihydrochloride, 2,2'-azobis[N-(2-hydroxyethyl)-2-methylpropionamidine] dihydrochloride, 2,2'-azobis[2-(5-methyl-2-imidazolin-2-yl) propane]dihydrocholride, 2,2'-azobis[2-(2-imidazolin-2-yl) propane]dihyrochloride 2,2'-azobis[2-(4,5,6,7-tetrahydro-1H-1,3-diazepin-2-yl)propane]-dihydrocholride, 2,2'-azobis [2-(3,4,5,6-tetrahydropyrimidin-2-yl)propane] dihyrochloride, 2,2'-azobis[2-(5-hydroxy-3,4,5,6-tetrahydropyrimidin-2-yl)propane]dihydrochloride, 2,2'-azobis{2-[1-(2-hydroxyethyl)-2-imidazolin-2-yl] propane}dihydrochloride, 2,2'-azobis[2-(2-imidazolin-2-yl) propane], 2,2'-azobis{2-methyl-N-[1,1-bis(hydroxymethyl)-2-hydroxyethyl]propionamide}, 2,2'-azobis{2-methyl-N-[1, 1-bis(hydroxymethyl)ethyl]propionamide}, 2,2'-azobis[2-methyl-N-(2-hydroxyethyl)propionamide], 2,2'-azobis(2-methylpropionamide)dihydrate, 2,2'-azobis(2,4,4-trimethylpentane), 2,2'-azobis(2-methylpropane), dimethyl 2,2'-azobisisobutyrate, 4,4'-azobis(4-cyanovalerate), 2,2'-azobis[2-(hydroxymethyl)propionitrile] and the like. The amount of the azo compound varies depending on the type of the azo compound, but is normally within the range from 0.1 to 10% by weight based on the composition excluding plasticizer.

As the monomer suitable for crosslinking due to irradiation of active energy ray such as ultraviolet ray, glycidyl ether acrylate, glycidyl methacrylate ether and glycidyl cinnamate ether are particularly preferable. As an auxiliary sensitizer, there can be optionally used acetophenones such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 2,2-dimethoxy-1,2-diphenylethan-1-one, 1-hydroxycyclohexyl-phenyl ketone, 2-methyl-2-morpholino(4-thiomethylphenyl)propan-1-one, etc.; benzoin ethers such as benzoin methyl ether, benzoin ethyl ether, benzoin isopropyl ether, benzoin isobutyl ether, etc. and benzoin,; benzophenones such as benzophenone, methyl o-benzoylbenzoate, 4-phenylbenzophenone, hydroxybenzophenone, 4-benzoyl-4'-methyl-diphenylsulfide, alkylated benzophenone, 3,3',4,4'-tetra(t-butylperoxycarbonyl)benzophenone, 4-benzoyl-N,N-dimethyl-N-[2-(1-oxo-2-propenyloxy)ethyl] benzenemethanaminiumbromide, (4-benzoylbenzyl) trimethylammoniumchloride, etc.; thioxanthones such as 2-isopropyl-thioxanthone, 2,4-dimethylthioxanthone, 2,4-diethylthioxanthone, 2,4-dichlorothioxanthone, etc.; azides such as azidopyrene, 3-sulfonylazido-benzoic acid, 4-sulfonylazidobenzoic acid, 2,6bis(4'-azidobenzal) cyclohexanone-2,2'-disulfonic acid (sodium salt), p-azidobenzaldehyde, p-azidoacetophenone, p-azidobenzoinic acid, p-azidobenzalacetophenone, p-azidobenzalacetone, 4,4'-diazidochalcone, 1,3-bis(4'-azidobenzal)acetone, 2,6-bis(4'-azidobenzal) cyclohexanone, 2,6-bis(4-azidobenzal)4-methyl-cyclohexanone, 4,4'-diazidostilbene-2,2 '-disulfonic acid, 1,3-4'-azidobenzal)-2-propanone-2'-sulfonic acid, 1,3-bis (4'-azidocinnacylidene)-2-propanone, etc.

As an auxiliary crosslinking agent of ultraviolet ray crosslinking reaction, for example, there can be optionally used ethylene glycol diacrylate, ethylene glycol dimethacrylate, olygoethylene glycol diacrylate, olygoethylene glycol dimethacrylate, propylene glycol diacrylate, propylene glycol dimethacrylate, olygopropylene glycol diacrylate, olygopropylene glycol dimethacrylate, 1,3-butylene glycol diacrylate, 1,4-butylene glycol diacrylate, 1,3-glycerol dimethacrylate, 1,1,1-trimethylolpropane dimethacrylate, 1,1,1-trimethylolethane diacrylate, pentaerythritol trimethacrylate, 1,2,6-hexane triacrylate, sorbitol pentamethacrylate, methylene bisacrylamide, methylene-bismethacrylamide divinylbenzene, vinyl methacrylate, vinyl crotonate, vinyl acrylate, vinyl acetylene, trivinyl benzene, triallyl cyanylsulfide, divinyl ether, divinyl sulfoether, diacryl phthalate, glycerol trivinyl ether, allyl methacrylate, allyl acrylate, diallyl maleate, diallyl fumarate, diallyl itaconate, methyl methacrylate, butyl acrylate, ethyl acrylate, 2-ethylhexyl acrylate, lauryl methacrylate, ethylene glycol acrylate, triallyl isocyanurate, maleimide, phenyl maleimide, p-quinone dioxime, maleic anhydride, itaconic acid and the like.

As a crosslinking agent having a hydrogenated silicon, for crosslinking the ethylenically unsaturated group, a compound having at least two hydrogenated silicons is used. Particularly, a polysiloxane compound or a polysilane compound is preferable.

Examples of the polysiloxane compound include a linear polysiloxane compound represented by the formula (c-1) or (c-2), or a cyclic polysiloxane compound represented by the formula (c-3).

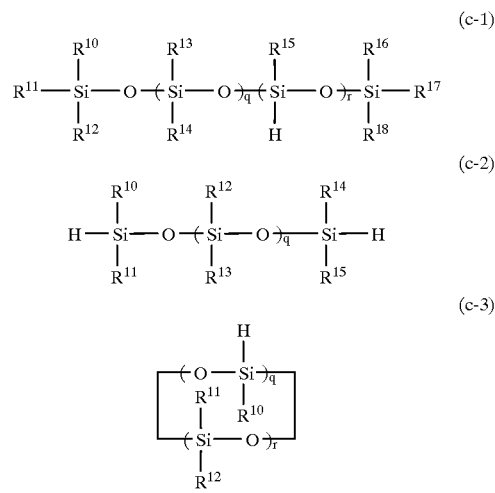

In the formulas (c-1) to (c-3), $R^{10}$, $R^{11}$, $R^{12}$, $R^{13}$, $R^{14}$, $R^{15}$ $R^{16}$, $R^{17}$ and $R^{18}$ respectively represent a hydrogen atom or an alkyl or alkoxy group having 1 to 12 carbon atoms, and in the formulas (c-1) and (c-3), $r \geq 2$, $q \geq 0, 2 \leq q+r \leq 300$, and in the formula (c-2), $0 \leq q \leq 300$. As the alkyl group, a lower alkyl group such as methyl group and ethyl group is preferable. As the alkoxy group, a lower alkoxy group such as methoxy group and ethoxy group is preferable.

As the silane compound, a linear silane compound represented by the formula (d-1) can be used. In the formula (d-1), $R^{10}$, $R^{11}$, $R^{12}$, $R^{13}$ and $R^{14}$ respectively represent a hydrogen atom or an alkyl or alkoxy group having 1 to 12 carbon atoms; and s and t represent an integer, wherein $t \geq 2, s \geq 0, 2 \leq s+t \leq 100$.

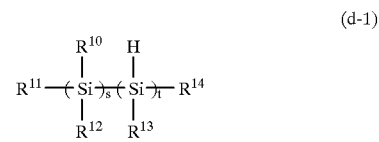

Examples of the catalyst for the hydrosilylation reaction include transition metals such as palladium, platinum, or a compound or complex thereof. Furthermore, peroxide, amine and phosphine are also used. The most popular catalyst includes dichlorobis(acetonitrile)palladium(II), chlorotris(triphenylphosphine)rhodium(I), chloroplatinic acid and the like.

Regarding the crosslinking method of the copolymer having an reactive silicon group, crosslink can be conducted by the reaction between the reactive silicon group and water. In order to enhance the reactivity, there may be used, as a catalyst, organometal compounds, for example, tin compounds such as dibutyltin dilaurate, dibutyltin maleate, dibutyltin diacetate, tin octylate, dibutyltin acetylacetonate, etc.; titanium compounds such as tetrabutyl titanate, tetrapropyl titanate, etc.; aluminum compounds such as aluminum trisacetyl acetonate, aluminum trisethyl acetoacetate, diisopropoxy aluminum ethylacetoacetate, etc.; or amine compounds such as butylamine, octylamine, laurylamine, dibutylamine, monoethanolamine, diethanolamine, triethanolamine, diethylenetriamine, triethylenetetraamine, cyclohexylamine, benzylamine, diethylaminopropylamine, guanine, diphenylguanine, etc.

As the crosslinking method of the copolymer having an epoxy group at the side chain, for example, polyamines, acid anhydrides, etc. are used.

Examples of polyamines include aliphatic polyamines such as diethylenetriamine, dipropylenetriamine, triethylenetetramine, tetraethylenepentamine, dimethylaminopropylamine, diethylaminopropylamine, dibutylaminopropylamine, hexamethylenediamine, N-aminoethylpiperazine, bis-aminopropylpiperazine, trimethylhexamethylenediamine, dihydrazide isophthalate, etc.; and aromatic polyamines such as 4,4'-diamino diphenyl ether, diamino diphenylsulfone, m-phenylenediamine, 2,4-toluylenediamine, m-toluylenediamine, o-toluylenediamine, xylylenediamine, etc. The amount of the polyamine varies depending on the type of the polyamine, but is normally within the range from 0.1 to 10% by weight based on the composition excluding the plasticizer.

Examples of the acid anhydrides include maleic anhydride, dodecenylsuccinic anhydride, chlorendic anhydride, phthalic anhydride, pyromellitic anhydride, hexahydrophthalic anhydride, methylhexahydrophthalic anhydride, tetramethylenemaleic anhydride, tetrahydrophthalic anhydride, methyltetrahydrophthalic anhydride, trimellitic anhydride, etc. The amount of the acid anhydride varies depending on the type of the acid anhydride, but is normally within the range from 0.1 to 10% by weight based on the composition excluding the plasticizer. An accelerator may used in the crosslinking. In case of the crosslinking reaction of the polyamines, examples of the accelerator include phenol, cresol, resorcin, pyrogallol, nonyl phenol, 2,4,6-tris(dimethylaminomethyl)phenol. In case of the crosslinking reaction of the acid anhydride, examples of the accelerator include benzyldimethylamine, 2,4,6-tris (dimethylaminomethyl)phenol, 2-(dimethylaminoethyl) phenol, dimethylaniline, 2-ethyl-4-methylimidazol, etc. The amount of the accelerator varies depending on the type of the accelerator, but is normally within the range from 0.1 to 10% by weight based on the crosslinking agent.

In the crosslinking method of the copolymer containing a halogen atom (e.g. bromine atom or iodine atom), for example, a crosslinking agent such as polyamines, mercaptoimidazolines, mercaptopyrimidines, thioureas, polymercaptanes, etc. is used. Examples of the polyamines include hexamethylenediamine carbamate, triethylenetetramine, tetraethylenepentamine, ethylenediamine carbamate, diethylenetriamine, dipropylenetriamine, dimethylaminopropylamine, diethylaminopropylamine, dibutylaminopropylamine, hexamethylenediamine, trimethylhexamethylenediamine, diaminophenyl sulfon, m-phenylenediamine, 2,4-toluylenediamine, m-toluylenediamine, o-toluylenediamine, xylenediamine and the like. Examples of the mercaptoimidazolines include 2-mercaptoimidazoline, 4-methyl-2-mercaptoimidazoline, 5-ethyl-4-butyl-2-mercaptoimidazoline and the like. Examples of the mercaptopyrimidines include 2-mercaptopyrimidine, 4,6-dimethyl-2-mercaptopyrimidine, 5-butyl-2-mercaptopyrimidine and the like. Examples of the thioureas include thiourea, ethylene thiourea, dibutyl thiourea, trimethyl thiourea, triethyl thiourea, tributyl thiourea and the like. Examples of the polymercaptanes include 2-dibutylamino-4,6-dimethylcapto-s-triazine, 2-phenylamino-4,6-dimercaptotriazine, 2,5-dimercapto-1,3,4-thiazole, 1,10-decanedithiol, 2,3-dimercaptopyrazine, 2,3-dimercaptoquinoxaline, 6-methylquinoxaline-2,3-dithiocarbonate and the like. The amount of the crosslinking agent varies depending on the kind of the crosslinking agent, but is normally from 0.1 to 30% by weight based on the composition excluding a plasticizer.

[Electrolyte Salt Compound]

The electrolyte salt compound used in the present invention may be any one which is soluble in the polyether polymer or the crosslinked material of the copolymer. The electrolyte salt compound is preferably soluble in the blend comprising the polyether copolymer of the present invention or a crosslinked material of the copolymer, and a plasticizer selected from an aprotic organic solvent or a derivative or a salt of a linear or branched polyalkylene glycol having a number-average molecular weight of 200 to 5000 or a metal salt of the derivative.

Examples of the electrolyte salt compound include compounds composed of a cation selected from a metal cation, ammonium ion, amidinium ion and guanidium ion, and an anion selected from chlorine ion, bromine ion, iodine ion, perchlorate ion, thiocyanate ion, tetrafluoroborate ion, nitrate ion, $AsF_6-$, $PF_6-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $R^{19}SO_3^-$, $[(R^{19}SO_2)(R^{20}SO_2)N]^-$, $[(R^{19}SO_2)(R^{20}SO_2)(R^{21}SO_2)C]^-$ and $[(R^{19}SO_2)(R^{20}SO_2)YC)]^-$, wherein $R^{19}$, $R^{20}$, $R^{21}$ and Y respectively represent an electron attractive group. More preferably, $R^{19}$, $R^{20}$ and $R^{21}$ independently represent a perfluoroalkyl or perfluoroaryl group having 1 to 6 carbon atoms and Y represents a nitro group, a nitroso group, a carbonyl group, a carboxyl group or a cyano group. $R^{19}$, $R^{20}$ and $R^{21}$ may be the same or different. As the metal cation, a cation of a transition metal can be used. Preferably, a cation of a metal selected from Mn, Fe, Co, Ni, Cu, Zn and Ag metals is used. When using a cation of a metal selected from Li, Na, K, Rb, Cs, Mg, Ca and Ba metals, good results are also obtained. Two or more compounds described above may be used as the electrolyte salt compound.

In the present invention, the amount of the above soluble electrolyte salt compound based on the total number of moles of ether oxygen atoms contained in the main chain and side chain of the polyether copolymer, namely a molar ratio of (the number of moles of the electrolyte salt compound) to (the total number of moles of ether oxygen atoms of polyether copolymer) is preferably within the range from 0.0001 to 5, more preferably from 0.001 to 0.5. When this ratio exceeds 5, the processability and moldability, and the mechanical strength and flexibility of the resulting solid electrolyte are deteriorated. Furthermore, the ionic conductivity is also deteriorated.

[Additive]

In the present invention, the polymer solid electrolyte of the present invention may contains a plasticizer selected from an aprotic organic solvent or a derivative or a salt of a linear or branched polyalkylene glycol having a number-average molecular weight of 200 to 5000 or a metal salt of the derivative.

As the aprotic organic solvent used in the present invention, aprotic ethers and esters can be used. Specific examples of the aprotic organic solvent include propylene carbonate, γ-butyrolactone, butylene carbonate, ethylene carbonate, dimethyl carbonate, ethylmethyl carbonate, diethyl carbonate, 1,2-dimethoxyethane, 1,2-dimethoxypropane, 3-methyl-2-oxyazolidone, tetrahydrofuran, 2-methyltetra-hydrofuran, 1,3-dioxolane, 4,4-methyl-1,3-dioxolane, tert-butyl ether, iso-butylether, 1,2-ethoxymethoxyethane, ethylene glycol dimethyl ether, ethylene glycol diethyl ether, triethylene glycol dimethyl ether, triethylene glycol diethyl ether, tetraethylene glycol dimethyl ether, tetraethylene glycol diethyl ether, ethylene glyme, ethylene diglyme, methyl tetraglyme, methyl triglyme, methyl diglyme, methyl formate, methyl acetate, methyl propionate, etc., and a mixture of two or more of them may be used. Particularly, propylene carbonate, γ-butyrolactone, butylene carbonate and 3-methyl-2-oxyazoline are preferable. Triethylene glycol dimethyl ether, triethylene glycol diethyl ether, tetraethylene glycol dimethyl ether and tetraethylene glycol diethyl ether are also particularly preferable organic solvents.

The amount of the aprotic organic solvent is from 0.01 to 10 g based on 1 g of the polyether copolymer.

The derivative or metal salt of the polyalkylene glycol or the metal salt of the derivative used in the present invention is obtained from a linear or branched polyalkylene glycol having a number-average molecular weight of 200 to 5000. More preferably, it is obtained from a polyalkylene glycol having a number-average molecular weight of 200 to 2000. The amount of the derivative or metal salt of the polyalkylene glycol or the metal salt of the derivative is from 0.01 to 10 g based on 1 g of the polyether copolymer.

Preferable examples of the polyalkylene glycol include linear or branched polyethylene glycol or polypropylene glycol. Examples of the derivative thereof include ester derivative or ether derivative containing an alkyl group having 1 to 8 carbon atoms or an alkenyl group having 3 to 8 carbon atoms.

Among the derivatives, examples of the ether derivative include diethers such as dimethyl ether, diethyl ether, dipropyl ether, diallyl ether, etc. of polyalkylene glycol, and examples of the ester derivatives include diesters such as dimethacrylate ester, diacetate ester and diacrylate ester of polyalkylene glycol.

Examples of the metal salt include sodium, lithium, and dialkyl aluminum salt of polyalkylene glycol.

Examples of the metal salt of the derivative include sodium, lithium and dialkylaluminum salts of monoethers of polyalkylene glycol, such as monomethyl ether, monoethyl ether, monopropyl ether, monobutyl ether, monohexyl ether, mono-2-ethyl-hexyl ether, monoallyl ether; and monoesters of polyalkylene glycol such as monoacetate ester, monoacrylate ester, monomethacrylate ester, etc.

When the flame retardance is required to the polyether copolymer, its crosslinked material, and polymer solid electrolyte obtained from them, there can be used a method which is normally used. That is, an effective amount of a flame retardant selected from halide (e.g. brominated epoxy compound, tetrabromobisphenol A, chlorinated paraffin, etc.), antimony trioxide, antimony pentoxide, aluminum hydroxide, magnesium hydroxide, phosphate ester, polyphosphate salt and zinc borate can be added.

The method for production of the polymer solid electrolyte of the present invention is not specifically limited. The polymer solid electrolyte can be obtained by mixing the polyether copolymer, the electrolyte salt compound and optionally the plasticizer.

The crosslinked polymer solid electrolyte is normally produced by a method of mechanically mixing a polyether copolymer with an electrolyte salt compound which is soluble in the copolymer, or mixing them after dissolving in a solvent, removing the solvent and crosslinking, or crosslinking a polyether copolymer and mechanically mixing the crosslinked polyether copolymer with an electrolyte which is soluble with the copolymer, or mixing them after dissolving in a solvent, and removing the solvent. As means for mechanically mixing, various kneaders, open roll, extruder, etc. can be optionally used. In case of production using the solvent, various polar solvents such as tetrahydrofuran, acetone, acetonitrile, dimethylformamide, dimethyl sulfoxide, dioxane, methyl ethyl ketone, methyl isobutyl ketone, etc. may be used alone or in combination thereof. The concentration of the solution is not specifically limited, but is preferably from 1 to 50% by weight.

The solid electrolyte comprising the polymer consisting of the repeating units (I') and (II') may be cross-linked, if necessary. Examples of a cross-linking agent used in case of cross-linking the copolymer include isocyanate compounds such as 2,4-tolylene diisocyanate, 2,6-tolylene diisocyanate, 4,4-diphenylmethane diisocyanate, hexamethylene diisocyanate and the like.

When the copolymer having an ethylenically unsaturated group is crosslinked by using a radical initiator, the crosslinking reaction is completed at the temperature of 10 to 200° C. within 1 minute to 20 hours. When using energy ray such as ultraviolet ray, etc., a sensitizer is normally used. The crosslinking reaction is normally completed at the temperature of 10 to 150° C. within 0.1 second to 1 hour. In case of a crosslinking agent having a hydrogenated silicon, the crosslinking reaction is completed at the temperature of 10 to 180° C. within 10 minutes to 10 hours.

The amount of water used in the crosslinking reaction of the copolymer having a reactive silicon group is not specifically limited because the crosslinking reaction occurs even in the presence of moisture in the atmosphere. The crosslinking can also be conducted by passing through a cold water or hot water bath for a short time, or exposing to a steam atmosphere.

When using a polyamine or an acid anhydride in the crosslinking reaction of the copolymer having an epoxy group, the crosslinking reaction is completed at the temperature of 10 to 200° C. within 10 minutes to 20 hours.

When the polymer solid electrolyte of the present invention contains the plasticizer, the production method of the polymer solid electrolyte is as follows. The respective components such as (A) a polyether copolymer, (B) a plasticizer (namely, an aprotic organic solvent or a derivative or a metal salt of a polyalkylene glycol having a number-average molecular weight of 200 to 5000 or a metal salt of the derivative), and (C) an electrolyte salt compound may be mechanically mixed. In case of the polyether copolymer requiring crosslink, it is produced by a method of mechanically mixing the respective components, followed by crosslinking. Alternatively, after crosslinking, the crosslinked copolymer may be impregnated with the component (B) or (C) by immersing in an organic solvent containing the component (B) or (C) for a long time. As means for mechanically mix, various kneaders, open roll, extruder, etc. can be optionally used. When using a radical initiator in the crosslinking reaction of the ethylenically unsaturated group, the crosslinking reaction is completed at the temperature of 10 to 200° C. within 1 minute to 20 hours. When using energy ray such as ultraviolet ray, etc., a sensitizer is normally used. The amount of water used in the crosslinking reaction of the copolymer having a reactive silicon group is not specifically limited because the crosslinking reaction occurs even in the presence of moisture in the atmosphere. In case of the crosslinking reaction of the epoxy group, the crosslinking reaction is completed at the temperature of 10 to 200° C. within 10 minutes to 20 hours.

The method of mixing the components (B) and (C) with the polyether copolymer (A) is not specifically limited, but examples thereof include a method of immersing the polyether copolymer in an organic solvent containing the components (B) and (C) for a long time, a method of mechanically mixing the components (B) and (C) with the polyether copolymer (A), a method of mixing the components (A), (B) and (C) by dissolving in an organic solvent, and a method of dissolving the polyether copolymer (A) in the other solvent and mixing the resulting solution with the components (B) and (C). The organic solvent used in mixing was removed after the polymer solid electrolyte was produced.

The non-crosslinked or crosslinked material of the copolymer serves as a precursor which is useful as a polymer solid electrolyte. The crosslinked polymer solid electrolyte of the present invention are superior in mechanical strength and flexibility, and a large area thin-film shaped solid electrolyte is easily obtained by utilizing the properties. For example, it is possible to make a battery comprising the polymer solid electrolyte of the present invention. In this case, examples of the positive electrode (cathode) material include lithiummanganese double oxide, lithium cobaltate, vanadium pentaoxide, polyacene, polypyrene, polyaniline, polyphenylene, polyphenylene sulfide, polyphenylene oxide, polypyrrole, polyfuran, polyazulene and the like. Examples of the negative electrode (anode) material include interlaminar compound prepared by occlusion of lithium between graphite or carbon layers, a lithium metal, a lithium-lead alloy and the like. The crosslinked polymer solid electrolyte can also be used as a diaphragm of an ion electrode of anion such as alkaline metal ion, and cation such as Cu ion, Ca ion and Mg ion.

PREFERRED EMBODIMENT OF THE INVENTION

The present invention is illustrated by the following Examples.

The results of the elemental analysis and composition analysis (in terms of monomer) of the polyether copolymer by $^1$H NMR spectrum are shown in the following Tables. In case of the measurement of the molecular weight of the polyether copolymer, the gel permeation chromatography measurement was conducted and the molecular weight was calculated in terms of standard polystyrene. The gel permeation chromatography measurement was conducted by a measuring device RID-6A manufactured by Shimadzu Corp., using a column such as Shodex KD-807, KD-806, KD-806M and KD-803 manufactured by Showa Denko K.K. and a solvent DMF (dimethylformamide). The glass transition temperature and heat of melting were measured in a nitrogen atmosphere within the temperature range from −100 to 80° C. at a heating rate of 10° C./min., using a differential scanning calorimeter DSC8230B manufactured by Rigaku Denki Co., Ltd. The measurement of the conductivity σ a was conducted as follows. That is, a film vacuum-dried at 20° C. under 1 mmHg for 72 hours was sandwiched between platinum electrodes and the conductivity was calculated according to the complex impedance method, using an A.C. method (voltage: 0.5 V, frequency: 5 Hz to 1 MHz). The flexibility of the solid electrolyte film was evaluated by the presence or absence of breakage in case of folding the film at an angle of 180 degrees at 25° C.

In the following Tables, a monomer of the formula (1) is represented by the formula (1):

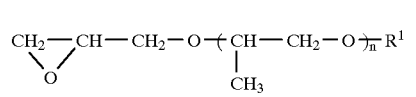

(1)

(Preparation Example of Monomer)

Dipropylene glycol monomethyl ether (500 g, 3.4 mol), epichlorohydrin (937 g, 10.1 mol) and triethylbenzylammonium chloride (7.6 g, 3.4×10$^{-2}$ mol) were charged in a flask equipped with a reflux condenser, a thermometer and a stirrer, and an aqueous 48% sodium hydroxide solution (337 g, 4.1 mol) was added dropwise for 1 hour with heating at 45° C. under stirring. After the completion of the dropwise addition, the reaction was conducted at the same temperature for 6 hours. After cooling, the reaction solution was extracted with methylene chloride, dried over sodium sulfate and then purified by distillation under reduced pressure to obtain 345 g (yield 50%) of dipropylene glycol glycidyl methyl ether as the desired product. The structure of the resulting product was confirmed by $^1$H NMR. The boiling point of the resulting product was 89° C. at 1 mmHg and the refractive index ($n_D^{30}$) was 1.4288. This monomer was used in, for example, Example 1 and Example 2.

(Preparation Example of Catalyst)

Tributyltin chloride (10 g) and tributyl phosphate (35 g) were charged in a three-necked flask equipped with a stirrer, a thermometer and a distillation device, and the mixture was heated at 250° C. for 20 minutes under nitrogen flow and the distillate was distilled off to obtain a solid condensate. This organotin-phosphate ester condensate was used as a catalyst for polymerization reaction.

EXAMPLES 1 TO 2 AND COMPARATIVE EXAMPLE 1 TO 5

Each polyether copolymer (1 g) shown in Table 1 and Table 2 (polyethylene oxide was used in place of the polyether copolymer in Comparative Example 1) was dissolved in tetrahydrofuran (20 ml), and the resulting solution was mixed with a tetrahydrofuran solution of lithium perchlorate so that a ratio of the number of moles of the soluble electrolyte salt compound to the total number of moles of oxygen atoms of ether is 0.05. This mixed liquid was casted on a mold made of polytetarfluoroethylene, and sufficiently dried to give a film.

EXAMPLE 3

The polyether copolymer (1 g) shown in Table 1 was dissolved in acetonitrile (20 ml), and the resulting solution was mixed with an acetonitrile solution of lithium bistrifluoromethane sulfonylimide (hereinafter referred to as "LiTFSI") so that a ratio of the number of moles of LiTFSI to the total number of moles of oxygen atoms of ether is 0.03. This mixed solution was casted on a mold made of polytetrafluoroethylene, and sufficiently dried to obtain a film. In the same manner as in Examples 1 and 2, characteristics of the film were measured. The conductivity of the solid electrolyte at 35° C. was 7.8×10$^{-5}$S/cm.

EXAMPLES 4 AND 5

Each polyether copolymer (1 g) shown in Table 1 was dissolved in acetonitrile (20 ml), and the resulting solution was mixed with an acetonitrile solution of LiTFSI so that a ratio of the number of moles of LiTFSI to the total number of moles of oxygen atoms of ether is 0.05. This mixed solution was casted on a mold made of polytetrafluoroethylene, and sufficiently dried to obtain a film. In the same manner as in Examples 1 to 2, characteristics of the film were measured.

It is apparent from a comparison with Comparative Examples that the electrolyte of the present invention has excellent ionic conductivity.

EXAMPLE 6

Using the polymer solid electrolyte obtained in Example 3 as the electrolyte, a lithium metal foil as the negative electrode and lithium cobaltate (LiCoO$_2$) as the positive electrode, a secondary battery was constructed. The size of the polymer solid electrolyte was 10 mm×10 mm×1 mm. The size of the lithium foil was 10 mm×10 mm×0.1 mm. Lithium cobaltate was prepared by mixing a predetermined amount of lithium carbonate with a cobalt carbonate powder and calcining the mixture at 900° C. for 5 hours. The calcined mixture was ground, and then 12 parts by weight of acetylene black and 3 parts by weight of the polymer solid electrolyte obtained in Example 3 were added to 85 parts by weight of the resulting lithium cobaltate, followed by mixing by a roll and press-molding under the pressure of 300 KgW/cm$^2$ to form a positive electrode having the size of 10 mm×10 mm×2 mm.

The polymer solid electrolyte obtained in Example 3 was sandwiched between the lithium metal foil and lithium cobaltate plate, and the charge/discharge characteristics of the resulting battery were examined with applying the pressure of 10 KgW/cm$^2$ so that the interfaces are brought into contact with each other. The discharge current at the initial terminal voltage of 3.2 V is 0.4 mA/cm$^2$ and charge could be conducted at 0.3 mA/cm$^2$. It is possible to reduce the thickness of the battery in this Example and, therefore, a light-weight and large-capacity battery can be obtained.

adjusted to at most 10 ppm, dipropylene glycol glycidyl methyl ether (170 g) and n-hexane (1000 g) as the solvent were charged in the flask, and ethylene oxide (200 g) was gradually added with monitoring the polymerization degree of dipropylene glycol glycidyl methyl ether by gas chromatography. The polymerization reaction was terminated by using methanol. The polymer was isolated by decantation, dried at 40° C. under a normal pressure for 24 hours, and then dried at 45° C. under reduced pressure for 10 hours to obtain 272 g of a polymer. The glass transition temperature of this copolymer was −71° C., the weight-average molecular weight was 900,000 and the heat of melting was 35 J/g. The results of the composition analysis (in terms of monomer) of this polymer by $^1$H NMR spectrum are as shown in Table 3.

EXAMPLES 8 TO 19

Using the monomers shown in Table 3 and the same catalyst as in Example 7, the copolymerization was conducted in the same manner as in Example 7. The results are shown in Table 3.

EXAMPLE 20

The copolymer (1 g) obtained in Example 7 and a crosslinking agent dicumyl peroxide (0.015 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of oxygen atoms of ether of the copolymer) was 0.05. This

TABLE 1

| | Example No. | | | | |
|---|---|---|---|---|---|
| | 1 | 2 | 3 | 4 | 5 |
| Composition of copolymer (% by mol) | | | | | |
| Ethylene oxide | 95 | 92 | 83 | 72 | 56 |
| Monomer component of the formula (1) | 5 | 8 | 17 | 28 | 44 |
| Constituent unit of the formula (1) | | | | | |
| Substituent: R$^1$ | —CH$_2$—CH=CH$_2$ | —C$_2$H$_5$ | —CH$_3$ | —CH$_3$ | —CH$_3$ |
| Polymerization degree: n | 2 | 2 | 3 | 2 | 2 |
| Weight-average molecular weight of copolymer | 2,400,000 | 1,200,000 | 800,000 | 700,000 | 350,000 |
| Glass transition temperature of copolymer (°C.) | −68 | −69 | −71 | −74 | −75 |
| Heat of melting of copolymer (J/g) | 69 | 58 | 40 | 19 | 19 |
| Conductivity of solid electrolyte film (S/cm) 35° C. | 4.6 × 10$^{-5}$ | 5.1 × 10$^{-5}$ | 7.8 × 10$^{-5}$ | 9.1 × 10$^{-5}$ | 9.7 × 10$^{-5}$ |

TABLE 2

| | Comparative Example No. | | | | |
|---|---|---|---|---|---|
| | 1 | 2 | 3 | 4 | 5 |
| Composition of copolymer (% by mol) | | | | | |
| Ethylene oxide | 100 | | | 98 | 20 |
| Epichlorohydrin | | 77 | | | |
| Propylene oxide | | | 72 | | |
| Monomer component of the formula (1) | | 23 | 28 | 2 | 80 |
| Constituent unit of the formula (1) | | | | | |
| Substituent: R$^1$ | | —CH$_3$ | —CH$_3$ | —CH$_3$ | —CH$_3$ |
| Polymerization degree: n | | 2 | 2 | 1 | 2 |
| Weight-average molecular weight of copolymer | 800,000 | 350,000 | 350,000 | 2,300,000 | 200,000 |
| Glass transition temperature of copolymer (° C.) | −59 | −33 | −70 | −63 | −72 |
| Heat of melting of copolymer (J/g) | 175 | 18 | 3 | 90 | 24 |
| Conductivity of solid electrolyte film (S/cm) 35° C. | 2.9 × 10$^{-6}$ | 3.2 × 10$^{-9}$ | 4.5 × 10$^{-8}$ | 8.9 × 10$^{-6}$ | impossible to measure because of plastic deformation |

EXAMPLE 7

After the atmosphere in a four-necked glass flask (internal volume: 3 L) was replaced by nitrogen, the condensed substance (1 g) obtained in the Preparation Example as the catalyst, allyl glycidyl ether (19 g) having water content mixed solution was casted on a mold made of polytetrafluoroethylene, dried, heated at 170° C., 60 KgW/cm² for 10 minutes and pressured to obtain a film. The results are shown in Table 4.

EXAMPLE 21

The polyether copolymer (1 g) obtained in Example 8 and a crosslinking agent 1,1-bis(t-butylperoxy)-3,3,5-trimethylcyclohexane (0.02 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of oxygen atoms of ether of the copolymer) was 0.05. This mixed solution was casted on a mold made of polytetrafluoroethylene, dried, heated at 145° C. and 100 KgW/cm² for 10 minutes and pressured to obtain a film. The results are shown in Table 4.

EXAMPLE 22

The polyether copolymer (1 g) obtained in Example 9 and a crosslinking agent benzoyl oxide (0.015 g) were dissolved in acetonitrile (20 ml), and the resulting solution was mixed with an acetonitrile solution of lithium bistrifluoromethanesulfonylimide so that a molar ratio of (the number of moles of the electrolyte salt compound) to (the total number of moles of oxygen atoms of ether of the copolymer) was 0.05. Then, a film was obtained in the same manner as in Example 20. The results are shown in Table 4.

EXAMPLE 23

The polyether copolymer (1 g) obtained in Example 10 and a crosslinking agent azobisisobutyronitrile (0.02 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of oxygen atoms of ether of the copolymer) was 0.05. This mixed solution was casted on a mold made of polytetarfluoroethylene and allowed to stand at 100° C. under an argon atmosphere for 2 hours to obtain a film. The results are shown in Table 4.

EXAMPLE 24

The polyether copolymer (1 g) obtained in Example 11 and a sensitizer 2,2-dimethoxy-1,2-diphenylethan-1-one (0.02 g) were dissolved in tetrahydrofuran (20 ml), and the resulting solution was mixed with a tetrahydrofuran solution of lithium perchlorate so that a molar ratio of (the number of moles of the electrolyte salt compound) to (the total number of moles of oxygen atoms of ether of the copolymer) was 0.05. This mixed solution was casted on a mold made of polytetrafluoroethylene and dried, followed by ultraviolet ray irradiation (30 mW/cm², 360 nm) at 50° C. under an argon atmosphere for 10 minutes to obtain a film. The results are shown in Table 4.

EXAMPLE 25

The polyether copolymer (1 g) obtained in Example 12 and polysiloxane represented by the formula (i) (0.2 g) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of (the number of moles of the electrolyte salt compound) to (the total number of moles of oxygen atoms of ether of the copolymer) was 0.05. Then, a film was obtained in the same manner as in Example 20. The results are shown in Table 4. In the formula (i), Mn represents a number-average molecular weight.

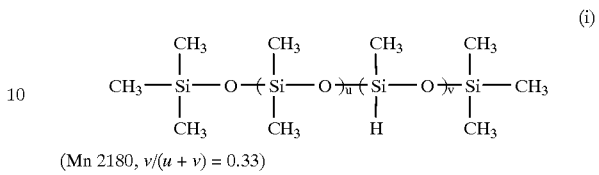

(Mn 2180, $v/(u + v) = 0.33$)

EXAMPLE 26

The polyether copolymer (1 g) obtained in Example 13 and polysiloxane represented by the formula (ii) (0.2 g) were dissolved in toluene (10 ml) and an isopropyl alcohol solution containing 1% by weight of chloroplatinic acid was added, and the resulting solution was mixed with a toluene solution of lithium bistrifluoromethanesulfonylimide so that a molar ratio of (the number of moles of the soluble electrolyte salt compound) to (the total number of moles of oxygen atoms of ether of the copolymer) was 0.05. Then, a film was obtained in the same manner as in Example 20. The results are shown in Table 4. In the formula (ii), Mn represents a number-average molecular weight.

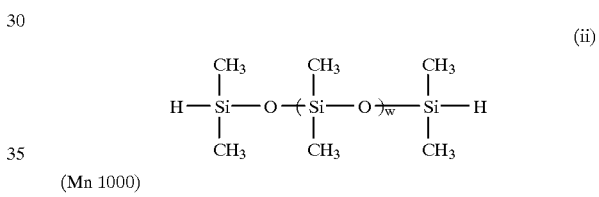

(Mn 1000)

EXAMPLE 27

The polyether copolymer (1 g) obtained in Example 14 and a catalyst dibutyltin dilaurate (5 mg) were dissolved in terahydrofuran (20 ml), and the resulting solution was mixed with a terahydrofuran solution of lithium perchlorate so that a molar ratio of (the number of moles of the electrolyte salt compound) to (the total number of moles of oxygen atoms of ether of the copolymer) was 0.05. Water was added to this mixed solution in the same molar amount as that of the reactive silicon group-containing component. Then, this mixed solution was casted on a mold made of polytetrafluoroethylene, dried and then allowed to stand at 100° C. under an argon atmosphere for 3 hours to obtain a film. The results are shown in Table 4.

EXAMPLE 28

The polyether copolymer (1 g) obtained in Example 15 was dissolved in tetrahydrofuran (20 ml), and the resulting solution was mixed with a tetrahydrofuran solution of lithium perchlorate so that a molar ratio of (the number of moles of the electrolyte salt compound) to (the total number of moles of oxygen atoms of ether of the copolymer) was 0.05. To this mixed solution, water was added so that the mole amount of water is three times the reactive silicon group-containing monomer. This mixed solution was casted on a mold made of polytetrafluoroethylene, dried, heated at 160° C. and 20 KgW/cm² for 10 minutes and pressured to obtain a film. The results are shown in Table 4.

EXAMPLE 29

The polyether copolymer (1 g) obtained in Example 16 and a catalyst dibutyltin dilaurate (5 mg) were dissolved in tetrahydrofuran (20 ml) and water (10 μl) was added, followed by stirring for 15 minutes. After the solvent was removed under a normal pressure, the mixed solution was dried at 60° C. for 10 hours to obtain a crosslinked material. The resulting crosslinked material was impregnated with a tetrahydrofuran solution (5 ml) containing lithium perchlorate (100 mg) for 20 hours, heated at 170° C. and 80 KgW/cm$^2$ for 10 minutes and pressured to obtain a film. The results are shown in Table 4.

EXAMPLE 30

The polyether copolymer (1 g) obtained in Example 17 and maleic anhydride (150 mg) were dissolved in tetrahydrofuran (20 ml), and the resulting solution was mixed with a tetrahydrofuran solution of lithium perchlorate so that a molar ratio of (the number of moles of the soluble electrolyte salt compound) to (the total number of moles of oxygen atoms of ether of the copolymer) was 0.05. This mixed solution was casted on a mold made of polytetrafluoroethylene, dried, heated at 160° C. and 20 KgW/cm$^2$ for 1 hour and pressured to obtain a film. The results are shown in Table 4.

EXAMPLE 31

The polyether copolymer (1 g) obtained in Example 18 and diethylenetriamine (50 mg) were dissolved in tetrahydrofuran (20 ml), and the resulting solution was mixed with a tetrahydrofuran solution of lithium perchlorate so that a molar ratio of (the number of moles of the soluble electrolyte salt compound) to (the total number of moles of oxygen atoms of ether of the copolymer) was 0.05. This mixed solution was casted on a mold made of polytetrafluoroethylene, dried and then allowed to stand at 100° C. under an argon atmosphere for 10 hours to obtain a film. The results are shown in Table 4.

EXAMPLE 32

The copolymer (1 g) obtained in Example 19 and diethylenetriamine (50 mg) were dissolved in tetrahydrofuran (20 ml) and the reaction was conducted at 40° C. for 2 hours. After the solvent was removed under a reduced pressure, the mixed solution was dried at 60° C. for 6 hours to obtain a crosslinked material. The resulting crosslinked material was impregnated with a tetrahydrofuran solution (5 ml) containing lithium perchlorate (100 mg) for 20 hours, heated at 160° C. and 100 KgW/cm$^2$ for 10 minutes and pressured to obtain a film. The results are shown in Table 4.

TABLE 3

| | Copolymer |||||||
|---|---|---|---|---|---|---|---|
| | Example No. |||||||
| | 7 | 8 | 9 | 10 | 11 | 12 | 13 |
| Composition of charged monomer (% by mol) | | | | | | | |
| Ethylene oxide | 82 | 91 | 82 | 60 | 75 | 50 | 91 |
| Allyl glycidyl ether | 3 | 3 | | | 5 | 3 | 1 |
| Glycidyl methacrylate | | | 3 | 3 | | | |
| Monomer of the formula (1) | 15 | 6 | 15 | 37 | 20 | 47 | 8 |
| Oxypropylene unit of the side chain portion of the formula (1) | | | | | | | |
| Polymerization degree: n | 2 | 2 | 2 | 1 | 3 | 2 | 1 |
| Substituent: R$^1$ | —CH$_3$ | —CH$_3$ | —C$_2$H$_5$ | —CH$_3$ | —CH$_3$ | —C$_2$H$_5$ | —CH$_2$—CH=CH$_2$ |
| Composition of formed copolymer (% by mol) | | | | | | | |
| Ethylene oxide | 83 | 91 | 83 | 61 | 78 | 52 | 91 |
| Allyl glycidyl ether | 3 | 3 | | | 4 | 3 | 1 |
| Glycidyl methacrylate | | | 3 | 3 | | | |
| Monomer of the formula (1) | 14 | 6 | 14 | 36 | 18 | 45 | 8 |
| Weight-average molecular weight of copolymer | 900,000 | 1,900,000 | 690,000 | 580,000 | 330,000 | 200,000 | 1,060,000 |
| Glass transition temperature of copolymer (° C.) | −71 | −69 | −70 | −71 | −72 | −74 | −69 |
| Heat of melting of copolymer (J/g) | 35 | 67 | 30 | 18 | 30 | 0 | 68 |

| | Example No. ||||||
|---|---|---|---|---|---|---|
| | 14 | 15 | 16 | 17 | 18 | 19 |
| Composition of charged monomer (% by mol) | | | | | | |
| Ethylene oxide | 90 | 82 | 70 | 82 | 75 | 68 |
| 3-Glycidoxypropylmethyldimethoxysilane | 0.1 | 0.05 | | | | |
| 3-Glycidoxypropyltrimethoxysilane | | | 0.03 | | | |
| 2,3-Epoxypropyl-2',3'-epoxy-2'-methyl propyl ether | | | | 8 | 8 | |
| Diethylene glycol 2,3-epoxypropyl-2',3'-epoxy-2'-methyl propyl ether | | | | | | 8 |
| Monomer of the formula (1) | 9.9 | 17.95 | 29.97 | 10 | 17 | 24 |

TABLE 3-continued

| Copolymer | | | | | | |
|---|---|---|---|---|---|---|
| Oxypropylene unit of the side chain portion of the formula (1) | | | | | | |
| Polymerization degree: n | 2 | 2 | 2 | 2 | 2 | 2 |
| Substituent: $R^1$ | —$CH_3$ | —$CH_3$ | —$C_2H_5$ | —$CH_3$ | —$CH_3$ | —$C_2H_5$ |
| Composition of formed copolymer (% by mol) | | | | | | |
| Ethylene oxide | 90.9 | 83 | 73 | 84 | 77 | 70 |
| 3-Glycidoxypropylmethyldimethoxysilane | 0.1 | 0.05 | | | | |
| 3-Glycidoxypropyltrimethoxysilane | | | 0.03 | | | |
| 2,3-Epoxypropyl-2',3'-epoxy-2'-methyl propyl ether | | | | 6 | 7 | |
| Diethylene glycol 2,3-epoxypropyl-2',3'-epoxy-2'-methyl propyl ether | | | | | | 7 |
| Monomer of the formula (1) | 9.0 | 16.95 | 26.97 | 10 | 16 | 23 |
| Weight-average molecular weight of copolymer | 2,800,000 | 1,400,000 | 1,020,000 | 400,000 | 320,000 | 220,000 |
| Glass transition temperature of copolymer (° C.) | −68 | −69 | −70 | −69 | −70 | −72 |
| Heat of melting of copolymer (J/g) | 75 | 57 | 34 | 41 | 32 | 23 |

TABLE 4

| Polymer solid electrolyte | | | | | | | |
|---|---|---|---|---|---|---|---|
| | Example No. | | | | | | |
| | 20 | 21 | 22 | 23 | 24 | 25 | 26 |
| Used copolymer | Example 7 | Example 8 | Example 9 | Example 10 | Example 11 | Example 12 | Example 13 |
| Flexibility of solid electrolyte film | Not broken | Not broken | Not broken | Not broken | Not broken | Not broken | Not broken |
| Conductivity of solid electrolyte film (S/cm) | | | | | | | |
| 35° C. | $7.2 \times 10^{-5}$ | $4.1 \times 10^{-5}$ | $6.3 \times 10^{-5}$ | $8.8 \times 10^{-5}$ | $5.2 \times 10^{-5}$ | $9.1 \times 10^{-5}$ | $4.2 \times 10^{-5}$ |
| 65° C. | $4.1 \times 10^{-4}$ | $2.2 \times 10^{-4}$ | $3.3 \times 10^{-4}$ | $5.4 \times 10^{-4}$ | $2.6 \times 10^{-4}$ | $5.9 \times 10^{-4}$ | $2.3 \times 10^{-4}$ |

| | Example No. | | | | | |
|---|---|---|---|---|---|---|
| | 27 | 28 | 29 | 30 | 31 | 32 |
| Used copolymer | Example 14 | Example 15 | Example 16 | Example 17 | Example 18 | Example 19 |
| Flexibility of solid electrolyte film | Not broken | Not broken | Not broken | Not broken | Not broken | Not broken |
| Conductivity of solid electrolyte film (S/cm) | | | | | | |
| 35° C. | $3.7 \times 10^{-5}$ | $6.9 \times 10^{-5}$ | $7.6 \times 10^{-5}$ | $5.2 \times 10^{-5}$ | $6.7 \times 10^{-5}$ | $6.8 \times 10^{-5}$ |
| 65° C. | $1.8 \times 10^{-4}$ | $3.4 \times 10^{-4}$ | $4.5 \times 10^{-4}$ | $2.6 \times 10^{-4}$ | $3.2 \times 10^{-4}$ | $3.3 \times 10^{-4}$ |

COMPARATIVE EXAMPLES 6 to 9

The polyether copolymer obtained in the same manner as in Example 7 and shown in Table 5 was used.

In Comparative Example 6, molding of a film was conducted in the same manner as that described in Example 20 except for adding no crosslinking agent. In Comparative Example 7, a film molding was conducted in the same manner as that described in Example 21. In Comparative Example 8, a film molding was conducted in the same manner as that described in Example 27. In Comparative Example 9, a film molding was conducted in the same manner as that described in Example 30. The results are shown in Table 5.

It is apparent from a comparison with Comparative Examples that the ionic conductivity and mechanical characteristics of the crosslinked polymer solid electrolyte obtained from the polyether copolymer of the present invention are excellent.

TABLE 5

Copolymer and polymer solid electrolyte

|  | Comparative Example No. | | | |
| --- | --- | --- | --- | --- |
|  | 6 | 7 | 8 | 9 |
| Composition of formed copolymer (% by mol) | | | | |
| Ethylene oxide | 85 | 97 | 65 | 60 |
| Allyl glycidyl ether |  | 3 |  |  |
| 3-Glycidoxypropyltrimethoxysilane |  |  | 25 |  |
| 2,3-Epoxypropyl-2',3'-epoxy-2'-methyl propyl ether |  |  |  | 30 |
| Monomer of the formula (1) | 15 |  | 10 | 10 |
| Oxypropylene unit of the side chain portion of the formula (1) | | | | |
| Polymerization degree: n | 3 | 2 | 2 | 2 |
| Substituent: $R^1$ | —$CH_3$ | —$CH_3$ | —$CH_3$ | —$CH_3$ |
| Weight-average molecular weight of copolymer | 780,000 | 980,000 | insoluble in solvent | insoluble in solvent |
| Glass transition temperature of copolymer (° C.) | −70 | −62 | cannot be measured | cannot be measured |
| Heat of melting of copolymer (J/g) | 45 | 157 | cannot be measured | cannot be measured |
| Flexibility of solid electrolyte film | Not broken | Not broken | impossible to form film | impossible to form film |
| Conductivity of solid electrolyte film (S/cm) | | | | |
| 35° C. | $7.5 \times 10^{-5}$ | $2.8 \times 10^{-6}$ | cannot be measured | cannot be measured |
| 65° C. | difficult to measure due to plastic deformation | $9.8 \times 10^{-6}$ | cannot be measured | cannot be measured |

EXAMPLE 33

Using the crosslinked polymer solid electrolyte obtained in Example 20 as the electrolyte, a lithium metal foil as the negative electrode and lithium cobaltate ($LiCoO_2$) as the positive electrode, a secondary battery was constructed. The size of the crosslinked polymer solid electrolyte was 10 mm×10 mm×1 mm. The size of the lithium foil was 10 mm×10 mm×0.1 mm. Lithium cobaltate was prepared by mixing predetermined amounts of lithium carbonate and cobalt carbonate powder and calcining the mixture at 900° C. for 5 hours. The calcined mixture was ground, and then 12 parts by weight of acetylene black and 3 parts by weight of the crosslinked polymer solid electrolyte obtained in Example 20 were added to 85 parts by weight of the resulting lithium cobaltate, followed by mixing by a mortar and further press-molding under the pressure of 300 KgW/$cm^2$ to form a positive electrode having the size of 10 mm×10 mm×2 mm.

The crosslinked polymer solid electrolyte obtained in Example 20 was sandwiched between the lithium metal foil and lithium cobaltate plate, and the charge/discharge characteristics of the resulting battery were examined with applying the pressure of 10 KgW/$cm^2$ so that the interfaces were brought into contact with each other. The discharge current at the initial terminal voltage of 3.2 V was 0.4 mA/$cm^2$ and charging could be conducted at 0.3 mA/$cm^2$. It is possible to reduce the thickness of the battery in this Example and, therefore, a light-weight and large-capacity battery can be obtained.

EXAMPLE 34

After the atmosphere in a four-necked glass flask (internal volume: 3 L) was replaced by nitrogen, an organotin-phosphate ester condensate catalyst (1 g), dipropylene glycol glycidyl methyl ether (200 g) having water content adjusted to at most 10 ppm and n-hexane (1,000 g) as the solvent were charged in the flask, and ethylene oxide (7.8 g) was gradually added with monitoring the polymerization degree of dipropylene glycol glycidyl methyl ether by gas chromatography. The polymerization reaction was terminated by using methanol. The polymer was isolated by decantation, dried at 40° C. under a normal pressure for 24 hours, and then dried at 45° C. under a reduced pressure for 10 hours to obtain 195 g of a polymer. The glass transition temperature of this copolymer was −75° C., the weight-average molecular weight by the gel permeation chromatography was 150,000 and the heat of melting was not recognized. The results of the composition analysis (in terms of monomer) of this polymer by $^1H$ NMR spectrum are as shown in Table 6. The resulting polyether copolymer (1 g) was mixed with a propylene carbonate solution of lithium perchlorate (1.0 ml) so that a molar ratio of (the number of moles of the soluble electrolyte salt compound) to (the total number of moles of oxygen atoms of ether of the polyether copolymer) was 0.05. This mixed solution was casted on a mold made of polytetrafluoroethylene, heated at 100° C. and 20 KgW/$cm^2$ for 10 minutes and pressured to obtain a film.

EXAMPLE 35

The polyether copolymer (1 g) shown in Table 6 polymerized by using the organotin-phosphate ester condensate catalyst in the same manner as that described in Example 34 and a crosslinking agent dicumyl peroxide (0.015 g) were dissolved in tetrahydrofuran (20 ml), and the resulting solution was mixed with a tetrahydrofuran solution of lithium perchlorate (5 ml) so that a molar ratio of (the number of moles of the soluble electrolyte salt compound) to (the total number of moles of oxygen atoms of ether of the polyether copolymer) was 0.05. This mixed solution was casted on a mold made of polytetrafluoroethylene, dried, heated at 160° C. and 20 KgW/cm² for 10 minutes and pressured to obtain a film. This film was immersed in a propylene carbonate liquid for 24 hours and impregnated with 0.7 ml of the liquid, and then allowed to stand at 100° C. for 24 hours to obtain a gel-like film.

EXAMPLE 36

The polyether copolymer (1 g) shown in Table 6 polymerized by using the organotin-phosphate ester condensate catalyst in the same manner as that described in Example 34 and a crosslinking agent dicumyl peroxide (0.015 g) were mixed with a propylene carbonate solution (0.5 ml) of lithium perchlorate so that a molar ratio of (the number of moles of the soluble electrolyte salt compound) to (the total number of moles of oxygen atoms of ether of the polyether copolymer) was 0.05. This mixed solution was casted on a mold made of polytetrafluoroethylene, dried, heated at 160° C. and 20 KgW/cm² for 10 minutes and pressured to obtain a gel-like film.

EXAMPLE 37

The polyether copolymer (1 g) shown in Table 6 polymerized by using the organotin-phosphate ester condensate catalyst in the same manner as that described in Example 34, polyethylene glycol dimethyl ester (number-average molecular weight Mn: 1000) (0.3 g) and a crosslinking agent dicumyl peroxide (0.015 g) were dissolved in tetrahydrofuran (20 ml), and the resulting solution was mixed with a tetrahydrofuran solution (5 ml) of lithium perchlorate so that a molar ratio of (the number of moles of the electrolyte salt compound) to (the total number of moles of oxygen atoms of ether of the polyether copolymer) was 0.05. This mixed solution was casted on a mold made of polytetrafluoroethylene dried, heated at 160° C. and 20 KgW/cm² for 10 minutes and pressured to obtain a film.

EXAMPLE 38

The polyether copolymer (1 g) shown in Table 6 polymerized by using the organotin-phosphate ester condensate catalyst in the same manner as that described in Example 34, polyethylene glycol diethyl ether (Mn: 1000)(0.2 g) and a crosslinking agent dicumyl peroxide (0.015 g) were dissolved in tetrahydrofuran (20 ml), and the resulting solution was mixed with a tetrahydrofuran solution (5 ml) of lithium perchlorate so that a molar ratio of (the number of moles of the electrolyte salt compound) to (the total number of moles of oxygen atoms of ether of the polyether copolymer) was 0.05. This mixed solution was casted on a mold made of polytetrafluoroethylene, dried, heated at 160° C. and 20 KgW/cm² for 10 minutes and pressured to obtain a film.

EXAMPLE 39

The polyether copolymer (1 g) shown in Table 6 polymerized by using the organotin-phosphate ester condensate catalyst in the same manner as that described in Example 34, a lithium salt of polyethylene glycol (prepared by adding metal lithium to polyethylene glycol having a number-average molecular weight of 400 in mole ratio of 2:1 and standing at room temperature for three days) (0.3 g) and a crosslinking agent dicumyl peroxide (0.015 g) were dissolved in a tetrahydrofuran (20 ml), and the resulting solution was mixed with a tetrahydrofuran solution (5 ml) of lithium perchlorate so that a molar ratio of (the number of moles of the electrolyte salt compound) to (the total number of moles of oxygen atoms of ether of the polyether copolymer) was 0.05. This mixed solution was casted on a mold made of polytetrafluoroethylene, dried, heated at 160° C. and 20 KgW/cm² for 10 minutes and pressured to obtain a film.

EXAMPLE 40

The polyether copolymer (1 g) shown in Table 6 polymerized by using the organotin-phosphate ester condensate catalyst in the same manner as that described in Example 34, a sodium salt of polyethylene glycol monomethyl ether (prepared by adding an equimolar amount of metal sodium to polyethylene glycol monomethyl ether having a number-average molecular weight of 500 and standing for 3 days at room temperature) (0.4 g) was dissolved in a tetrahydrofuran solution (20 ml) of lithium bistrifluoromethanesulfonylimide so that a molar ratio of (the number of moles of the electrolyte salt compound) to (the total number of moles of oxygen atoms of ether of the polyether copolymer) was 0.05. Then, an equimolar amount of water based on the reactive silicon group-containing monomer was added, followed by mixing. This mixed solution was casted on a mold made of polytetrafluoroethylene, dried, heated at 160° C. and 20 KgW/cm² for 10 minutes and pressured to obtain a film.

COMPARATIVE EXAMPLE 10

Polyethylene oxide (1 g) shown in Table 7 polymerized by using the organotin-phosphate ester condensate catalyst in the same manner as that described in Example 34 was mixed with a tetrahydrofuran solution of lithium perchlorate so that a molar ratio of (the number of moles of the electrolyte salt compound) to (the total number of moles of oxygen atoms of ether of the polyether copolymer) was 0.05. Furthermore, polyethylene glycol dimethyl ether (Mn: 1000) (0.2 g) was dissolved in tetrahydrofuran (20 ml) and the resulting solution was added. This mixed solution was casted on a mold made of polytetrafluoroethylene and then pressure-molded to obtain a film.

COMPARATIVE EXAMPLE 11

The same operation as that described in Example 34 was conducted, except for using the polyether polymer in Table 7 polymerized by using the organotin-phosphate ester condensate catalyst in the same manner as that described in Example 34, but a film could not be obtained.

COMPARATIVE EXAMPLE 12

The polyether copolymer (1 g) shown in Table 7 polymerized by using the organotin-phosphate ester condensate catalyst in the same manner as that described in Example 34 and a crosslinking agent dicumyl peroxide (0.015 g) were dissolved in a tetrahydrofuran solution (20 ml), and the resulting solution was mixed with a tetrahydrofuran solution of lithium perchlorate so that a molar ratio of (the number of moles of the electrolyte salt compound) to (the total number of moles of oxygen atoms of ether of the polyether copolymer) was 0.05. Furthermore, polyethylene glycol dimethyl ether (Mn: 1000) (0.2 g) was dissolved in tetrahydrofuran (20 ml) and this solution was added. This mixed solution was casted on a mold made of polytetrafluoroethylene, dried sufficiently to remove tetrahydrofuran, heated at 160° C. and 20 KgW/cm² for 10 minutes and pressured to obtain a film.

COMPARATIVE EXAMPLE 13

In the same manner as that described in Example 36 except for using the polyether copolymer shown in Table 7 polymerized by using the organotin-phosphate ester condensate catalyst in the same manner as that described in Example 34, a film was obtained.

EXAMPLE 41

Using the polymer solid electrolyte obtained in Example 36 as the electrolyte, a lithium metal foil as the negative electrode and lithium cobaltate (LiCoO$_2$) as the positive electrode, a secondary battery was constructed. The size of the polymer solid electrolyte was 10 mm×10 mm×0.2 mm. The size of the lithium foil was 10 mm×10 mm×0.1 mm. Lithium cobaltate was prepared by mixing predetermined amounts of lithium carbonate and cobalt carbonate powder and calcining the mixture at 900° C. for 5 hours. The calcined mixture was ground, and then 12 parts by weight of acetylene black and 3 parts by weight of the crosslinked polymer solid electrolyte obtained in Example 36 were added to 85 parts by weight of the resulting lithium cobaltate, followed by mixing by a roll and further press-molding under the pressure of 300 Kgw/cm$^2$ to form a positive electrode having the size of 10 mm×10 mm×2 mm.

The polymer solid electrolyte obtained in Example 36 was sandwiched between the lithium metal foil and lithium cobaltate plate, and the charge/discharge characteristics of the resulting battery were examined at 25° C. with applying the pressure of 10 Kgw/cm$^2$ so that the interfaces were brought into contact with each other. The discharge current at the initial terminal voltage of 3.8 V was 0.1 mA/cm$^2$ and charging could be conducted at 0.1 mA/cm$^2$. It is possible to reduce the thickness of the battery in this Example and, therefore, a light-weight and large-capacity battery can be obtained.

TABLE 6

| | Example No. | | | | | | |
|---|---|---|---|---|---|---|---|
| | 34 | 35 | 36 | 37 | 38 | 39 | 40 |
| Composition of formed copolymer (% by mol) | | | | | | | |
| Ethylene oxide | 15 | 90 | 52 | 59 | 89.97 | 54 | 68 |
| Allyl glycidyl ether | | | 3 | | | | |
| Glycidyl methacrylate | | | | 4 | | | |
| 3-Glycidoxypropyltrimethoxysilane | | | | | 0.03 | | |
| 2,3-Epoxypropyl-2,3'-epoxy-2'-methyl propyl ether | | | | | | 14 | 12 |
| Monomer of the formula (1) | 85 | 10 | 45 | 37 | 10 | 32 | 20 |
| Oxypropylene unit of the side chain portion of the formula (1) | | | | | | | |
| Polymerization degree: n | 2 | 1 | 2 | 1 | 3 | 2 | 1 |
| Substituent: R$^1$ | —CH$_3$ | —CH$_2$—CH=CH$_2$ | —C$_2$H$_5$ | —CH$_3$ | —CH$_3$ | —C$_2$H$_5$ | —CH$_3$ |
| Weight-average molecular weight of copolymer | 150,000 | 1,800,000 | 720,000 | 850,000 | 2,200,000 | 890,000 | 560,000 |
| Glass transition temperature of copolymer (° C.) | −75 | −72 | −74 | −73 | −69 | −71 | −72 |
| Heat of melting of copolymer (J/g) | 0 | 63 | 8 | 11 | 56 | 0 | 5 |
| Amount (g) of organic solvent or polyalkylene glycol compound per 1 g of the copolymer | 1.0 | 0.7 | 0.5 | 0.3 | 0.2 | 0.3 | 0.4 |
| Conductivity of solid electrolyte film (S/cm) 25° C. | 1.2 × 10$^{-2}$ | 6.1 × 10$^{-3}$ | 9.7 × 10$^{-3}$ | 4.3 × 10$^{-3}$ | 3.5 × 10$^{-3}$ | 6.2 × 10$^{-3}$ | 3.9 × 10$^{-3}$ |

TABLE 7

| | Comparative Example No. | | | |
|---|---|---|---|---|
| | 10 | 11 | 12 | 13 |
| Composition of formed copolymer (% by mol) | | | | |
| Ethylene oxide | 100 | | 98 | 58 |
| Allyl glycidyl ether | | | 2 | 3 |
| Epichlorohydrin | | | | 39 |
| Monomer of the formula (1) | | 100 | | |
| Oxypropylene unit of the side chain portion of the formula (1) | | | | |
| Polymerization degree: n | | 2 | | |
| Substituent: R$^1$ | | —CH$_3$ | | |
| Weight-average molecular weight of copolymer | 1,200,000 | 100,000 | 950,000 | 220,000 |
| Glass transition temperature of copolymer (°C.) | −59 | −74 | −62 | −49 |
| Heat of melting of copolymer (J/g) | 168 | 0 | 153 | 0 |
| Amount (g) of organic solvent or polyalkylene glycol compound per 1 g of the copolymer | 0.2 | 0.2 | 0.2 | 0.6 |
| Conductivity of solid electrolyte film (S/cm) 25° C. | 9.1 × 10$^{-5}$ | impossible to form a film | 1.3 × 10$^{-4}$ | 1.6 × 10$^{-6}$ |

EXAMPLES 42 TO 44

The polyether copolymer (1 g) shown in Table 8 polymerized by using the organotin-phosphate ester condensate catalyst in the same manner as in Example 34, a crosslinking agent (dicumyl peroxide) (0.01 g) and a N,N'-m-phenylenebismaleimide (0.005 g), a branched polyethylene glycol derivative (the compound of the formula (16) in Example 42, the compound of the formula (17) in Example 43 and the compound of the formula (18) in Example 44), and an acetonitrile solution (10 ml) of lithium perchlorate [the amount of lithium perchlorate is so that a molar ratio of (the number of moles of the electrolyte salt compound) to (the total number of moles of ether oxygen atoms of the polyether copolymer) was 0.06] were mixed. This mixed liquid was casted on a mold made of polytetrafluoroethylene, dried, heated at 160° C. and 20 KgW/cm² for 10 minutes and pressured to obtain a film.

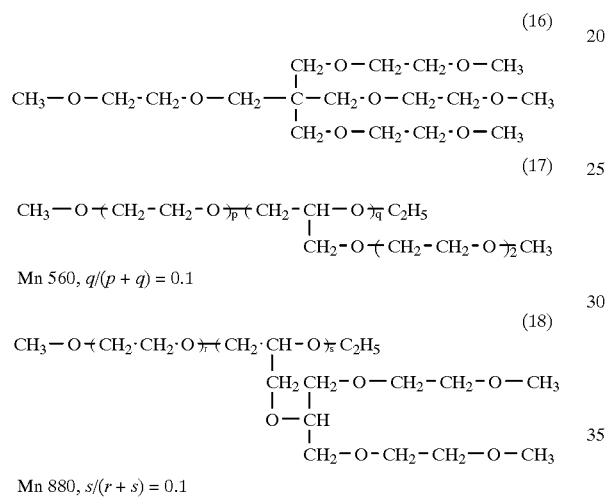

TABLE 8

| | Example No. | | |
|---|---|---|---|
| | 42 | 43 | 44 |
| Composition of formed copolymer (% by mol) | | | |
| Ethylene oxide | 87 | 80 | 75 |
| Allyl glycidyl ether | | 3 | 3 |
| Monomer of the formula (1) | 13 | 17 | 22 |
| Oxypropylene unit of the side chain portion of the formula (1) | | | |
| Polymerization degree: n | 3 | 2 | 2 |
| Substituent: R¹ | —CH₃ | —CH₃ | —CH₃ |
| Weight-average molecular weight of copolymer | 1,100,000 | 1,050,000 | 980,000 |
| Glass transition temperature of copolymer (° C.) | −70 | −71 | −73 |
| Heat of melting of copolymer (J/g) | 43 | 21 | 12 |
| Amount (g) of polyalkylene glycol compound per 1 g of the copolymer | 0.4 | 0.3 | 0.3 |
| Conductivity of solid electrolyte film (S/cm) 25° C. | 7.6 × 10⁻³ | 6.9 × 10⁻³ | 4.7 × 10⁻³ |

EFFECT OF THE INVENTION

The non-crosslinked or crosslinked polymer solid electrolyte of the present invention is superior in processability, moldability, mechanical strength, flexibility, heat resistance, etc., and the ionic conductivity is remarkably improved. Accordingly, it can be applied to electronic apparatuses such as large-capacity condenser and display device (e.g. electrochromic display, etc.) and an antistatic agent or electricity-controlling material for rubber, plastic, etc. in addition to solid battery.

What is claimed is:

1. A polyether copolymer having repeating structural units comprising 5 to 95% by mol of a monomer of the formula (I), 95 to 5% by mol of a monomer of the formula (II) and 0 to 15% by mol of a monomer of the formula (III) or (IV) as a crosslinking component; the copolymer having a weight-average molecular weight within the range from $10^3$ to $10^7$:

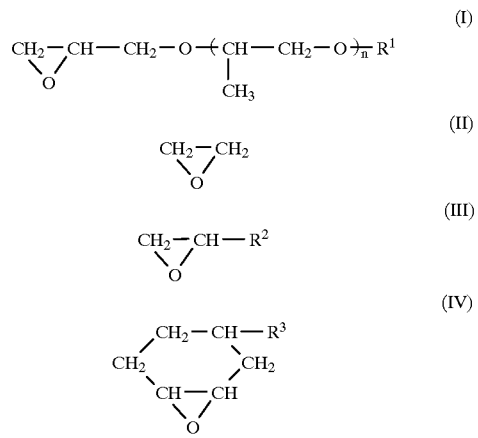

wherein $R^1$ of the formula (I) is a group selected from the group consisting of an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group; a polymerization degree n of an oxypropylene unit as the side chain portion is from 1 to 12; each of a substituent $R^2$ of the formula (III) and substituent $R^3$ of the formula (IV) is a substituent having an ethylenically unsaturated group, or a substituent having a reactive silicon group, or a substituent having an epoxy group at the terminal represented by the formula (V):

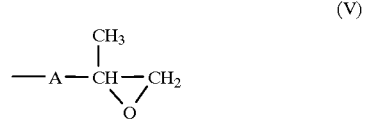

in which a group A represents a divalent organic moiety comprising atoms selected from the group consisting of carbon, oxygen and hydrogen atoms.

2. The polyether copolymer according to claim 1, wherein the copolymer comprises the monomer (I) and (II), and the content of the monomer (I) is from 5 to 70% by mol and the content of the monomer (II) is from 95 to 30% by mol.

3. The polyether copolymer according to claim 1, wherein the copolymer comprises the monomer (I), the monomer (II) and the monomer (III) or (IV), and the content of the monomer of the formula (I) is from 5 to 94% by mol, the content of the monomer of the formula (II) is from 94 to 5% by mol and the content of the monomer of the formula (III) or (IV) is from 0.001 to 15% by mol.

4. The polyether copolymer according to claim 1, wherein the substituent $R^2$ of the formula (III) is a crosslinking substituent having an ethylenically unsaturated group, and is a crosslinking monomer component obtained from the group consisting of a compound selected from allyl glycidyl ether, 4-vinylcyclohexyl glycidyl ether, α-terpinyl glycidyl ether, cyclohexenylmethylglycidyl ether, p-vinylbenzyl glycidyl ether, allylphenyl glycidyl ether, vinyl glycidyl ether, 3,4-epoxy-1-butene, 3,4-epoxy-1-pentene, 4,5-epoxy-2-pentene, 1,2-epoxy-5,9-cyclododecadiene, 3,4-epoxy-1-vinylcyclohexene, 1,2-epoxy-5-cyclooctene, glycidyl acrylate, glycidyl methacrylate, glycidyl sorbate, glycidyl cinnamate, glycidyl crotonate, glycidyl-4-hexenoate, olygoethylene glycol glycidyl ether acrylate having 1 to 12 oxyethylene chains, olygoethylene glycol glycidyl ether methacrylate having 1 to 12 oxyethylene chains and olygoethylene glycol allyl glycidyl ether having 1 to 12 oxyethylene chains.

5. The polyether copolymer according to claim 1, wherein the substituent $R^2$ of the formula (III) or $R^3$ of the formula (IV) is a crosslinking component having a reactive silicon group, and is a crosslinking component obtained from a compound selected from the group consisting of (a-1), (a-2) and (a-3):

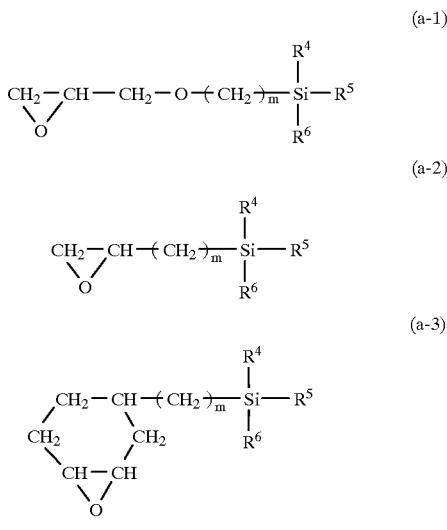

wherein $R^4$, $R^5$ and $R^6$ may be the same or different, but at least one of them represents an alkoxy group and the remainder represent an alkyl group; and m represents 1 to 6.

6. The polyether copolymer according to claim 1, wherein the substituent $R^2$ of the formula (III) is a crosslinking substituent having an epoxy group at the terminal, and is a crosslinking component obtained from a compound selected from the group consisting of (b-1), (b-2) and (b-3):

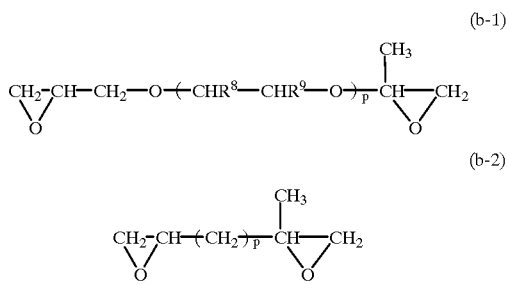

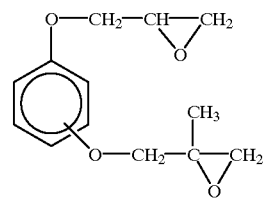

wherein, in the formula (b-1), $R^8$ and $R^9$ represents a hydrogen atom or a methyl group, and p of the formulas (b-1) and (b-2) represents 0 to 12.

7. A crosslinked material prepared by utilizing the reactivity of a crosslinking component of the polyether copolymer according to claim 1.

8. The crosslinked material according to claim 7, which is prepared by utilizing the reactivity of an ethylenically unsaturated group, a reactive silicon group, an epoxy group or a reactive halogen group of the polyether copolymer.

9. A polyether copolymer having repeating structural units comprising 5 to 95% by mol of a monomer of the formula (I), 95 to 5% by mol of a monomer of the formula (II) and 0 to 15% by mol of a monomer of the formula (III) or (IV) as a crosslinking component; the copolymer having a weight-average molecular weight within the range from $10^3$ to $10^7$:

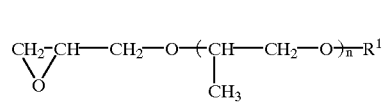

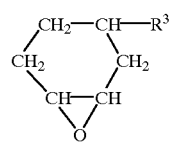

wherein $R^1$ of the formula (I) is a group selected from an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl group; a polymerization degree n of an oxypropylene unit as the side chain portion is from 1 to 12; each of a substituent $R^2$ of the formula (III) and a substituent $R^3$ of the formula (IV) is a substituent having an ethylenically unsaturated group, or a substituent having a reactive silicon group, or a substituent having an epoxy group at the terminal represented by the formula (V):

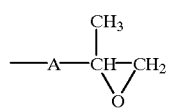

(V)

in which a group A represents a divalent organic moiety comprising atoms selected from carbon, oxygen and hydrogen atoms, the crosslinked material according to claim 7 and an electrolyte salt compound which is soluble in the polyether copolymer.

10. The polymer solid electrolyte according to claim 9, wherein the electrolyte salt compound is a compound composed of a cation selected from the group consisting of a metal cation, ammonium ion, amidinium ion and guanidium ion, and an anion selected from the group consisting of chlorine ion, bromine ion, iodine ion, perchlorate ion, thiocyanate ion, tetrafluoroborate ion, nitrate ion, $AsF_6^-$, $PF_6^-$, stearylsulfonate ion, octylsulfonate ion, dodecylbenzenesulfonate ion, naphthalenesufonate ion, dodecylnaphthalenesulfonate ion, 7,7,8,8-tetracyano-p-quinodimethane ion, $R^{19}SO_3^-$, $[(R^{19}SO_2)(R^{20}SO_2N]^-$, $[(R^{19}SO_2)(R^{20}SO_2)(R^{21}SO_2)C]^-$ and $[(R^{19}SO_2)(R^{20}SO_2)YC]^-$, wherein $R^{19}$, $R^{20}$, $R^{21}$ and Y respectively represent an electron attractive group.

11. The polymer solid electrolyte according to claim 10, wherein $R^{19}$, $R^{20}$ and $R^{21}$ independently represent a perfluoroalkyl or perfluoroaryl group having 1 to 6 carbon atoms and Y represents a nitro group, a nitroso group, a carbonyl group, a carboxyl group or a cyano group.

12. The polymer solid electrolyte according to claim 10, wherein the metal cation is a cation of a metal selected from the group consisting of Li, Na, K, Rb, Cs, Mg, Ca and Ba metals.

13. The polymer solid electrolyte according to claim 9, wherein the formulation ratio of the electrolyte salt compound to the polyether copolymer is so that a molar ratio of (the number of moles of the electrolyte salt compound) to (the total number of moles of ether oxygen atoms of the polyether copolymer) is from 0.0001 to 5.

14. The polymer solid electrolyte according to claim 8, which further contains a plasticizer selected from the group consisting of an aprotic organic solvent, a derivative, a metal salt of a linear or branched polyalkylene glycol having a number-average molecular weight of 200 to 5000, and a metal salt of the derivative.

15. The polymer solid electrolyte according to claim 14, wherein the aprotic organic solvent is an aprotic organic solvent selected from the group consisting of ethers and esters.

16. The polymer solid electrolyte according to claim 14, wherein the aprotic organic solvent is an organic solvent selected from the group consisting of propylene carbonate, γ-butyrolactone, butylene carbonate and 3-methyl-2-oxazolidone.

17. The polymer solid electrolyte according to claim 14, wherein the aprotic organic solvent is an organic solvent selected from the group consisting of triethylene glycol dimethyl ether, triethylene glycol diethyl ether, tetraethylene glycol dimethyl ether and tetraethylene glycol diethyl ether.

18. The polymer solid electrolyte according to 14, wherein the number-average molecular weight of the polyalkylene glycol is from 200 to 2000.

19. The polymer solid electrolyte according to claim 14, wherein the polyalkylene glycol is polyethylene glycol or polypropylene glycol.

20. The polymer solid electrolyte according to claim 14, wherein the derivative of the polyalkylene glycol is an ether derivative or an ester derivative.

21. The polymer solid electrolyte according to claim 14, wherein the ether derivative of the polyalkylene glycol is selected from the group consisting of polyethylene glycol dimethyl ether, polyethylene glycol diethyl ether and polyethylene glycol diallyl ether.

22. The polymer solid electrolyte according to claim 14, wherein the ester derivative of the polyalkylene glycol is selected from the group consisting of polyethylene glycol dimethacrylate ester, polyethylene glycol diacrylate ester and polyethylene glycol acetate ester.

23. The polymer solid electrolyte according to claim 14, wherein the metal salt of the polyalkylene glycol is selected from the group consisting of sodium salt, lithium salt and dialkylaluminum salt.

24. The polymer solid electrolyte according to claim 14, wherein the metal salt of the polyalkylene glycol is selected from the group consisting of lithium salt of polyethylene glycol and dialkylaluminum salt of polyethylene glycol.

25. The polymer solid electrolyte according to claim 14, wherein the metal salt of the polyalkylene glycol derivative is selected from the group consisting of lithium salt of polyethylene glycol monomethyl ether, lithium salt of polyethylene glycol monoethyl ether and lithium salt of polyethylene glycol monoallyl ether.

26. The polymer solid electrolyte according to claim 14, wherein the metal salt of the polyalkylene glycol derivative is selected from the group consisting of dioctylaluminum salt of polyethylene glycol monomethyl ether, dioctylaluminum salt of polyethylene glycol monoethyl ether and dioctylaluminum salt of polyethylene glycol monoallyl ether.

27. The polymer solid electrolyte according to any one of claims 14, wherein the amount of the plasticizer is from 0.01 to 10 g based on 1 g of the polyether copolymer.

28. A battery comprising the polymer solid electrolyte according to claim 9.

* * * * *